United States Patent [19]

Sakhin et al.

[11] Patent Number: 5,983,336

[45] Date of Patent: Nov. 9, 1999

[54] METHOD AND APPARATUS FOR PACKING AND UNPACKING WIDE INSTRUCTION WORD USING POINTERS AND MASKS TO SHIFT WORD SYLLABLES TO DESIGNATED EXECUTION UNITS GROUPS

[75] Inventors: Yuli Kh. Sakhin; Alexander M. Artyomov; Alexey P. Lizorkin; Vladimir V. Rudometov; Leonid N. Nazarov, all of Moscow, Russian Federation

[73] Assignee: Elbrush International Limited, George Town, Cayman Islands

[21] Appl. No.: 08/733,832

[22] Filed: Oct. 18, 1996

Related U.S. Application Data

[63] Continuation of application No. PCT/RU96/00218, Aug. 7, 1996, abandoned.

[51] Int. Cl.[6] .................................................. G06F 9/30
[52] U.S. Cl. ................... 712/24; 712/1; 712/23; 712/200; 712/205; 712/208; 712/210; 712/214; 712/215
[58] Field of Search .................. 395/800.24, 800.05, 395/376, 386, 390, 391, 381, 561, 562; 712/1, 23, 24, 200, 205, 208, 210, 214, 215

[56] References Cited

U.S. PATENT DOCUMENTS

| | | | |
|---|---|---|---|
| 4,128,880 | 12/1978 | Cray, Jr. ........................................ | 712/3 |
| 4,569,016 | 2/1986 | Hao et al. ................................. | 395/565 |
| 5,057,837 | 10/1991 | Colwell et al. ............................. | 341/55 |
| 5,179,680 | 1/1993 | Colwell et al. ........................... | 711/125 |
| 5,201,058 | 4/1993 | Kinoshita et al. .......................... | 712/12 |
| 5,303,356 | 4/1994 | Vassiliadis et al. ...................... | 395/585 |
| 5,333,280 | 7/1994 | Ishikawa et al. ........................ | 395/588 |
| 5,499,376 | 3/1996 | King et al. ............................. | 395/800.3 |
| 5,530,817 | 6/1996 | Masubuchi ......................... | 395/800.24 |
| 5,555,428 | 9/1996 | Radigan et al. ................... | 395/800.22 |
| 5,560,028 | 9/1996 | Sachs ................................. | 395/800.23 |
| 5,673,410 | 9/1997 | Kurisu ..................................... | 395/386 |
| 5,680,637 | 10/1997 | Hotta et al. ........................ | 395/800.24 |
| 5,721,854 | 2/1998 | Ebcioglu et al. ....................... | 395/379 |
| 5,732,234 | 3/1998 | Vassiliadis et al. ..................... | 395/376 |

Primary Examiner—Meng-Ai T. An
Assistant Examiner—Nabil El-Hady
Attorney, Agent, or Firm—Pennie & Edmonds LLP

[57] ABSTRACT

An unpacking circuit and operating method in a very long instruction word (VLIW) processor provides for parallel handling of a packed wide instruction in which a packed wide instruction is divided into groups of syllables. An unpacked instruction representation includes a plurality of syllables, which generally correspond to operations for execution by an execution unit. The syllables in the unpacked instruction representation are assigned to groups. The packed instruction word includes a sequence of syllables and a header. The header includes a descriptor for each group. The descriptor includes a mask and may include a displacement designator. The multiple groups are handled in parallel as the displacement designator identifies a starting syllable. The mask designates the syllables which are transferred from the packed instruction to the unpacked representation and identifies the position of NOPs in the unpacked representation.

20 Claims, 16 Drawing Sheets

METHOD AND APPARATUS FOR PACKING AND UNPACKING WIDE INSTRUCTION WORD USING POINTERS AND MASKS TO SHIFT WORD SYLLABLES TO DESIGNATED EXECUTION UNITS GROUPS

The present application is a continuation of a PCT international application designating the United States of America (Ser. No. PCT/RU96/00218) filed Aug. 7, 1996, naming Sakhin et al. as inventors and entitled "WIDE INSTRUCTION UNPACK METHOD AND APPARATUS".

BACKGROUND OF THE INVENTION

1. Field of the Invention

The present invention relates to processors and computing devices. More specifically the present invention relates to a method and apparatus in a Very Long Instruction Word (VLIW) processor for unpacking of operations in an instruction word in preparation for execution.

2. Description of the Related Art

Very Long Instruction Word (VLIW) processor architectures achieve efficient performance by exploiting instruction level parallelism in which a compiler performs most instruction scheduling and parallel dispatching at compile-time, reducing the operating burden at run-time. By moving scheduling tasks to the compiler, a VLIW processor avoids both the operating latency and the large and complex circuitry associated with on-chip instruction scheduling logic.

Each VLIW instruction includes multiple independent operations for execution by the processor in a single cycle. A VLIW compiler forms these instructions according to precise conformance to the structure of the processor, including the number and type of execution units, as well as execution unit timing and latencies. The compiler groups the operations into a wide instruction for execution in one cycle. At run-time, the wide instruction is applied to the various execution units with little decoding. Execution units which are idle in a particular cycle are issued a no-operation (NOP) signal.

Characteristic of VLIW processors are massive storage and bandwidth demands that arise from the nature of the wide instruction. Each wide instruction, as applied to the execution units, includes an operation field for each execution unit. However, in a given cycle one or more execution units are likely to be idle so that, in an operating instruction code, a high percentage of the operations are NOPs, essentially wasting a large storage capacity. Bandwidth is used to direct the wide instruction, typically from memory through a cache and to the execution units at a fast bit rate. The large percentage of NOPs in the wide instructions, as applied to the execution units, increases the bandwidth burden of a VLIW processor.

One technique for reducing these storage and bandwidth requirements is the usage of instruction packing for storage and handling of operations in the wide instruction. A packed wide instruction typically includes a packed set of operation designators with NOPs removed but with a header containing information for unpacking the instruction and designating the position of operations and NOPs.

In one unpacking implementation, an instruction compaction method is used in a high-speed cache miss engine for refilling portions of the instruction cache after a cache miss. In this method, an instruction word is placed in a compacted form on a storage medium. Each instruction word includes a mask word having a length in bits at least equal to the number of instruction fields in the instruction word. Each instruction field is associated with a bit of the mask word with a particular position in the mask word relating to a particular position in the unpacked instruction representation. Using the mask word, only nonzero instruction fields are stored in memory. Every bit mask determines only the presence or absence of the next instruction field. The beginning of a very long instruction word is set by a zero value in the bit mask. Thus, the mask alone only conveys information regarding the total length of the associated very long instruction word. At run-time, the packed instruction is unpacked by accessing the header of each very wide instruction and generating an unpack function from the header. One problem with the apparatus and method is that a complex circuit is required for unpacking since a full multiplexer is needed for each instruction field greatly increasing the bandwidth demand and latency of the unpacking circuit. Another problem is a difficulty in determining, for a field in the packed instruction, the position in the unpacked representation since all fields previous to a field must be unpacked before the position of the field may be ascertained.

In another unpacking implementation disclosed by R. P. Colwell et al. in U.S. Pat. No. 5,057,837, entitled "INSTRUCTION STORAGE METHOD WITH A COMPRESSED FORMAT USING A MASK WORD", a variable-length packed very long instruction word includes a header with a bit mask. The bit mask includes a bit for each very long instruction word fragment in an unpacked representation. The bit determines the presence or absence of a very long instruction word fragment that corresponds to the bit and determines the position of a fragment in the unpacked representation. The number of mask bits equal to 1 determines the total length of the packed very long instruction word. For each fragment, the unpacking circuit must analyze the number of preceding fragments that are present. Thus, the complexity of the unpacking control function increases for each additional fragment in the very long instruction word. This technique presents some difficulty in locating the beginning of each very long instruction word.

Each of these conventional unpacking techniques involves substantial latency, bandwidth burden and unpacking circuit complexity due to the lack of parallel handling within the unpacking circuit.

What is needed is an unpacking circuit and method in a VLIW processor that reduces latency, bandwidth burden and circuit size and complexity.

SUMMARY OF THE INVENTION

In accordance with the present invention, an unpacking circuit and operating method in a very long instruction word (VLIW) processor provides for parallel handling of a packed wide instruction in which a packed wide instruction is divided into groups of syllables. An unpacked instruction representation includes a plurality of syllables, which generally correspond to operations for execution by an execution unit. The syllables in the unpacked instruction representation are assigned to groups. The packed instruction word includes a sequence of syllables and a header. The header includes a descriptor for each group. The descriptor includes a mask and may include a displacement designator. The multiple groups are handled in parallel as the displacement designator identifies a starting syllable. The mask designates the syllables which are transferred from the packed instruction to the unpacked representation and identifies the position of NOPs in the unpacked representation.

The described method and unpacking circuit have numerous advantages. The definition and usage of a displacement field advantageously allows increased speed and performance of instruction unpacking without introducing the circuit complexity. The unpack decode unit is advantageously configured, as desired to attain a selected balance of circuit size and performance. Usage of the displacement field of a final syllable group to designate both the final group displacement and the size of the wide instruction advantageously conserves storage.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE PREFERRED EMBODIMENTS

Figure 1:
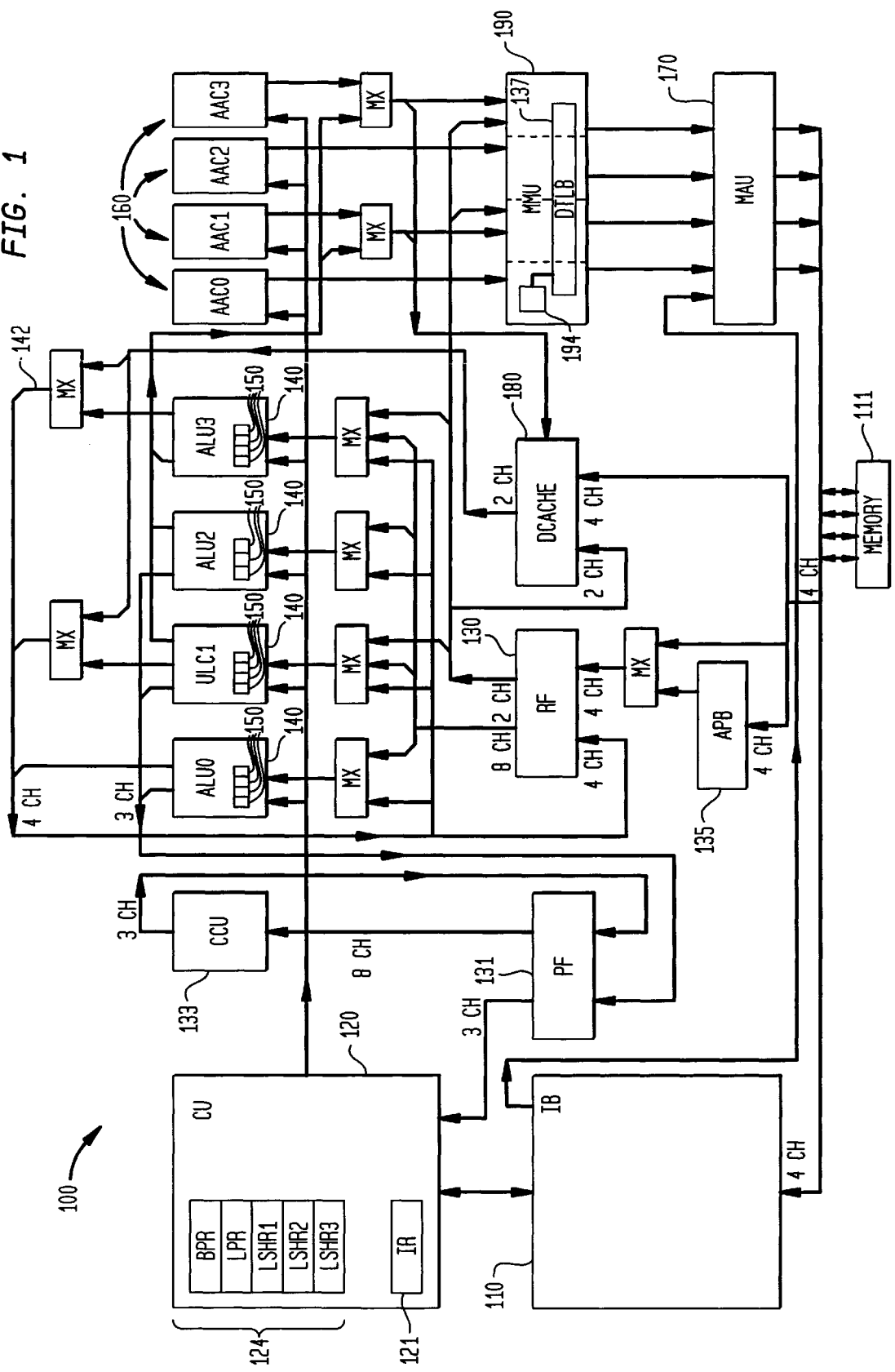
FIG. 1 is a schematic block diagram which illustrates a central processing unit (CPU) which includes a wide instruction unpack apparatus in accordance with an embodiment of the present invention.

Referring to FIG. 1, a Central Processor Unit (CPU) 100 has a wide instruction word architecture and uses Instruction Level Parallelism (ILP) to ensure high performance. The CPU compiler is used to plan the operations to be executed by the CPU 100 in each cycle. The processor structure allows concurrent execution of a few simple independent instructions (operations) that constitute a wide instruction (load, store, add, multiply, divide, shift, logical, branch, etc.). Wide instructions are stored in a memory 111 connected to the CPU 100 in packed form as sets of 16 and 32 bits syllables. Particular operations can occupy a part of syllable, a whole syllable or several syllables. The EU 150 operation execution time is one cycle for integer and logic operations, two cycles for floating point addition, three or four cycles for floating point multiplication, seven cycles for word format division and ten to eleven cycles for two-word format, normalized operands. All operations except division may be run in every cycle. Division may be run every other cycle.

The Central Processor Unit 100 contains an Instruction Buffer (IB) 110, a Control Unit (CU) 120, a multiport Predicate File (PF) 131, a multiport Register File (RF) 130, a Calculate Condition Unit (CCU) 133, a Data Cache (DCACHE) 180, four Arithmetic Logic Units (ALU0–ALU3) generally identified as 140, each of which includes a plurality of execution units (EUs) which are shown generally as EU 150, an Array Prefetch Buffer (APB) 135, four Array Access Channels (AAC0–AAC3) generally identified as 160, a Memory Management Unit (MMU) 190, and Memory Access Unit (MAU) 170. The combination of wide instruction operation and a large number of execution units 150 allows several alternative program branches to execute concurrently in a speculative mode.

The Instruction Buffer (IB) 110 fetches wide instructions from the memory 111 and includes an instruction buffer memory which is filled in response to both linear program path prefetches and control transfer preparation instructions. The Instruction Buffer (IB) 110 contains 2048 64-bit words and is divided into sixteen sectors. Program code is stored in virtual memory (not shown) which is common with data code storage. IB 110 has a separate Instruction Translate Lookaside Buffer (ITLB) 117 with 32 entries. IB 110 filling is initiated by hardware for direct way when direct way code is exhausted in IB 110 and by a program when prepare control transfer operation is executed. IB 110 performs program code filling for three branches. In the case of IB 110 miss, the program code is loaded from memory 111 by four memory access channels in parallel (four 64-bit words simultaneously). IB 110 and Control Unit (CU) 120 perform reading from IB 110 and dispatching of the maximum size wide instruction (eight 64-bit words) every cycle.

The control unit (CU) 120 generates wide instructions in an unpacked form, transforms indirect based operands addresses of wide instruction to absolute addresses in a register file 130, checks the conditions of the wide instruction issue. The wide instruction issue conditions which are checked include checking for no exceptions, no interlock conditions from other units of CPU 100, and availability of operands in the register file (RF) 130.

The Control Unit (CU) 120 issues wide instruction operations for execution and performs several tasks including reading of up to ten operands from the register file (RF) 130 to ALU0–ALU3 140, reading up to three predicate values from the Predicate File (PF) 131 to Control Unit (CU) 120 as condition code for control transfer operations, reading up to eight predicate values from the Predicate File (PF) 131 to the Calculate Condition Unit (CCU) 133 for calculation of new predicate values and generation of a mask of condition execution of operations in ALU0–ALU3 140 and AAC0–AAC3 160, issuing literal values to ALU0–ALU3 140 and AAC0–AAC3 160, issuing up to four operations to ALU0–ALU3 140, issuing up to four operations to AAC0–AAC3 160, and issuing up to four operations to the Calculate Condition Unit (CCU) 133. The Control Unit (CU) 120 also issues a prepare control transfer operation to Control Unit (CU) 120 and checks for the possibility of the execution of three control transfer operations in Control Unit (CU) 120. The control unit 120 receives an "H-syllable" of an instruction word, transforms operand addresses from the instruction that are base-relative into effective register file addresses, and checks conditions of the next instruction delivery from an unpacked instruction register (not shown) to an execution unit 150. The control unit 120 also executes control transfer operations (CTOPs) and includes loop parameter and status registers 124 such as a loop parameters register (LPR), and loop state registers (LSR1 and LSR2).

The Predicate File (PF) 131 is a storage of predicate values generated by integer and floating point compare operations. Predicate values are used to control the conditional execution of operations. The Predicate File (PF) 131 contains 32 two-bit registers.

The Calculate Condition Unit (CCU) 133 generates a mask for the conditional execution of ALUi 140 and AACi 160 operations and calculates values of the secondary predicate as the primary predicates function.

The Register File (RF) 130 contains 256 66-bit registers and has ten read ports and eight write ports. All ten read ports are used to read ALU 140 operands and two read ports are used to read stored values to the Data Cache (DCACHE) 180 and the Memory Management Unit (MMU) 190. Four write ports are used to write ALUs results and the other four write ports are used to write values loaded from memory. The register file 130 accesses the 256 66-bit registers using four address bases (CWP, CWPAR, BR1 and BR2). Each base addresses up to 64 registers.

ALU0–ALU3 140 are four parallel executive channels and have nearly the same sets of arithmetic and logic operations. ALU1 and ALU3 are used to calculate addresses of scalar memory accesses. All ALUs receive operands from register file (RF) 130 and bypass buses 142. The bypass abates the time of delivery of ALUs operations results to the following operations. ALU0 and ALU2 receive two operands and ALU1 and ALU3 receive three operands for execution of combined three-argument operations. ALU 140 operation results are written to the register file (RF) 130 through four RF write channels.

The Array Access Channels AAC0–AAC3 160 are four parallel channels for generation of array elements addresses for loops. Each AACi contains eight pair of address registers which are current address register and increment register. All AACi 160 have the same operations set including a current array element address generation operation with or without the next element address calculation. For memory accesses, one pair of address registers in each channel is used in every cycle. AAC0 and AAC2 are used only for load memory accesses. AAC1 and AAC3 are used for load and store memory accesses.

The Memory Management Unit (MMU) 190 contains a four-port Data Translate Lookaside Buffer (DTLB) 137 with 64 entries and performs hardware search in Page Table in DTLB 137 miss case. The Memory Management Unit (MMU) 190 also contains a Disambiguation Memory 194 for checking rearrangement correctness of load and store operations, performed by an optimizing compiler.

The Memory Access Unit (MAU) 170 is an interface for communicating between the CPU 100 and external memory at an exchange rate of up to four information words transferred during a cycle. The Memory Access Unit contains an entry buffer for memory requests and a crossbar of four data and one group instruction buffer (IB) 110 memory access channels to four physical memory channels. Two least significant bits of physical addresses are the physical memory channel number.

The Data Cache (DCACHE) 180 caches data for scalar memory access. Data Cache (DCACHE) 180 is write-through, 32 Kbytes, four-way set associative with 64-byte blocks, virtually addressed and virtually tagged, dual-ported with 64-bit data paths. Data Cache (DCACHE) 180 output is united with ALUs output that permits to use bypass buses 142 to abate data transfer to ALUs. In the case of DCACHE miss data from memory are transferred to Data Cache (DCACHE) 180 through four channels simultaneously.

The Array Prefetch Buffer (APB) 135 is used to prefetch array elements for loops from memory. The Array Prefetch Buffer (APB) 135 is a four-channel FIFO buffer. The Array Prefetch Buffer (APB) 135 contains 4×48 66-bit registers. Data are transferred from the Array Prefetch Buffer (APB) 135 to the register file (RF) 130 when the data are ready.

The CPU 100 has four memory access channels. Each channel has 64 bits data path.

Referring to FIGS. 2(A) through 2(G), multiple pipeline diagrams illustrate operating stages of the processor 100. Integer instructions. For integer operations, shown in FIG. 2(A), a fixed-length pipeline has five stages including fetch (F) 210, decode (D) 212, read (R) 214, execute (E) 216 and write (W) 218 stages. Each stage completes processing in one clock cycle. During the fetch (F) 210 stage, packed wide instructions move from memory, typically from the instruction cache 110 to the processor 100. The processor 100 converts packed wide instructions to unpacked instructions and computes effective base-relative addresses of registers in the decode (D) 212 stage. In case of branch and call preparation instructions, a target address is computed in the decode 212 (D) cycle. A control transfer condition is evaluated in the decode (D) 212 stage. The processor 100 reads operands from the register file 130 and detects instruction dependencies during the read (R) 214 stage. During the execute (E) 216 stage, arithmetic and logic operations are performed on the source operands. The processor 100 generates addresses for memory addresses during the execute cycle (E) 216. In the write (W) 218 stage, the processor 100 writes ALU results into the register file 130.

Figure 2A:
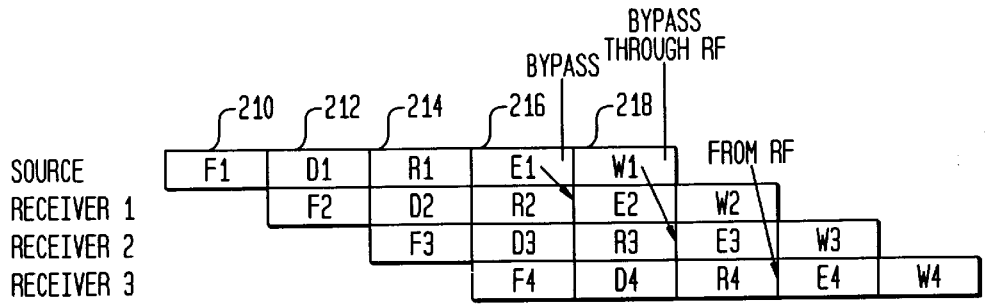
FIGS. 2(A) through 2(F) are multiple pipeline diagrams showing operating stages of the processor.
Figure 2B:
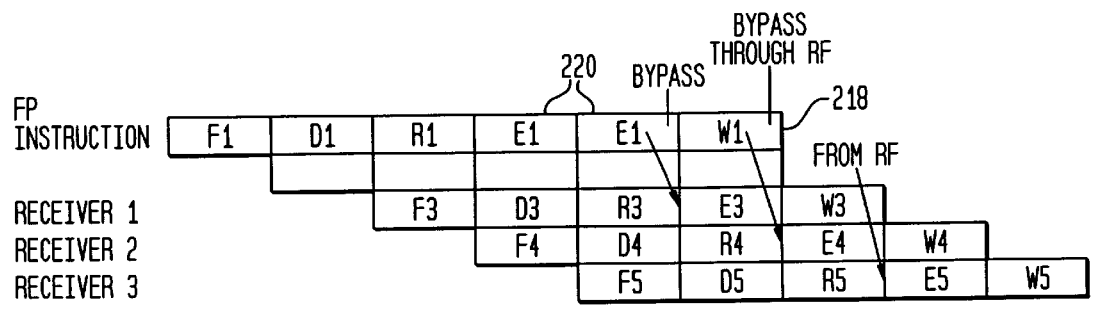

Two levels of internal forwarding or stage bypassing are used in response to pipeline dependencies. Referring to FIG. 2(B), a first path bypasses a result of an ALU directly to input terminals of the operand registers 141 and is activated when a source operand of an operation is the same as the destination operand of the operation occurring two operations preceding the current operation.

Figure 2C:
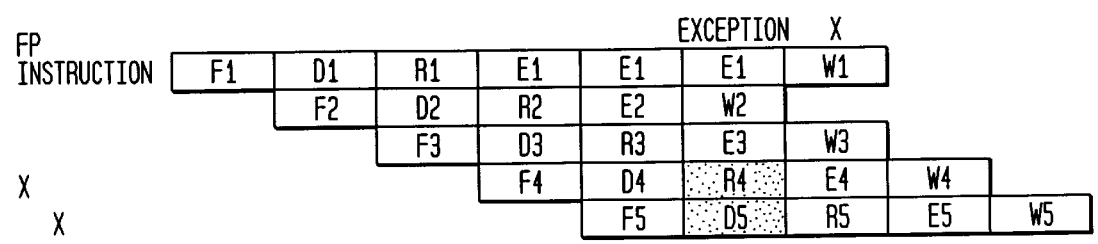
Figure 2D:
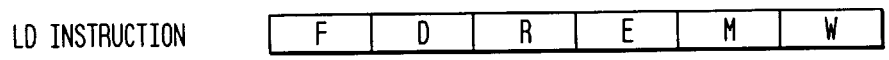

Referring to FIG. 2(C), timing of a floating point operation is the same as the timing of integer operations except that the execute (E) stage 220 is longer than the execute (E) 216 of integer operations. Result transmission of a floating point operation during the write (W) 218 is the same as integer operation result transmission. If a floating point exception occurs, the write (W) stage is not performed. Referring to FIG. 2(D), operations in the read (R) 214 stage or the decode (D) 212 stage at the time of the exception are also not performed.

Figure 2E:
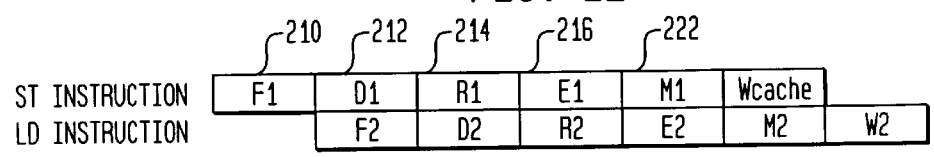
Figure 2F:
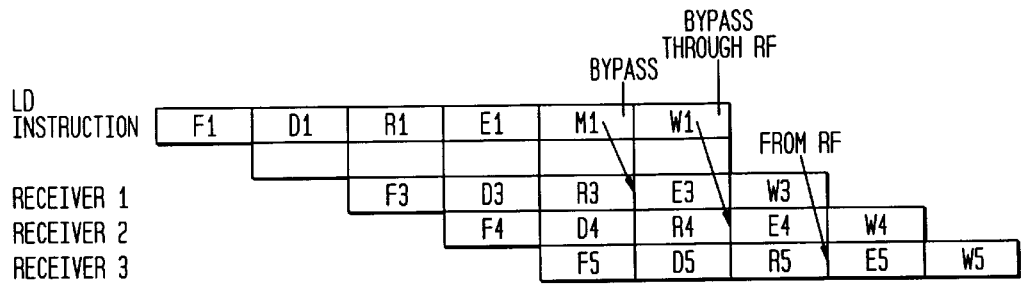

Referring to FIG. 2(E), a memory access instruction includes one extra memory (M) 222 stage for performing data transfers. If a cache miss occurs, operations following the cache miss are not locked. When read and write addresses coincide, written data are transferred within a single clock cycle as shown in FIG. 2(F).

Referring to FIG. 2(G), a second path is formed between the data cache 180 and an ALU 150 which bypasses data from the data cache 180 to the operand registers 141 when the source operand of an operation is the same as the destination operand of the load operation two operations prior to the current operation.

Figure 3A:
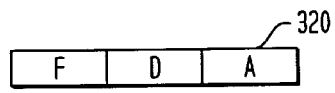
FIGS. 3(A) through 3(D) are multiple pipeline diagrams showing operating stages of the processor for branching and conditional operations.
Figure 3B:
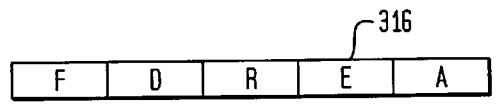
Figure 3C:
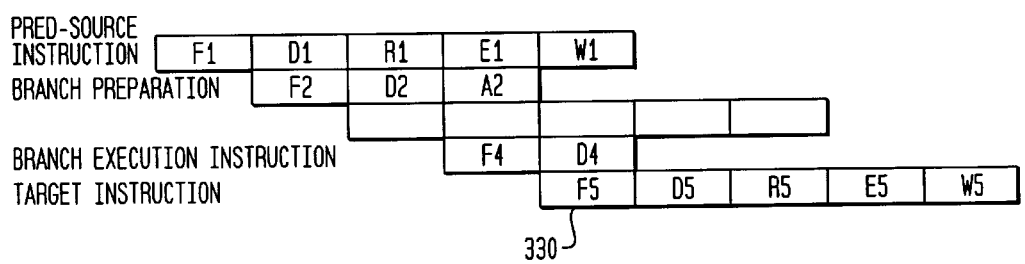
Figure 3D:
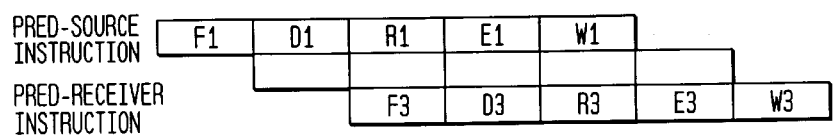

Referring to FIGS. 3(A) through 3(D),), multiple pipeline diagrams illustrate operating stages of the processor for branching and conditional operations. Branch and call preparation operations use a search (A) stage 320 to search the instruction cache 110 as shown in FIG. 3(A). In case of a JUMPL operation, having pipeline diagram shown in FIG. 3(B), a target address is computed in the execute (E) 316 stage. Referring to FIG. 3(C), a branch instruction occurs simultaneous with the search (A) 320 stage of the preparation instruction and at the next cycle the target instruction is fetched (F5) 330. The compare operation supplies predicates in a cycle subsequent to the execute (E) stage. Predicates are evaluated in the read (R) cycle of the operation performed in the condition mode as is shown in FIG. 3(D).

Figure 4:
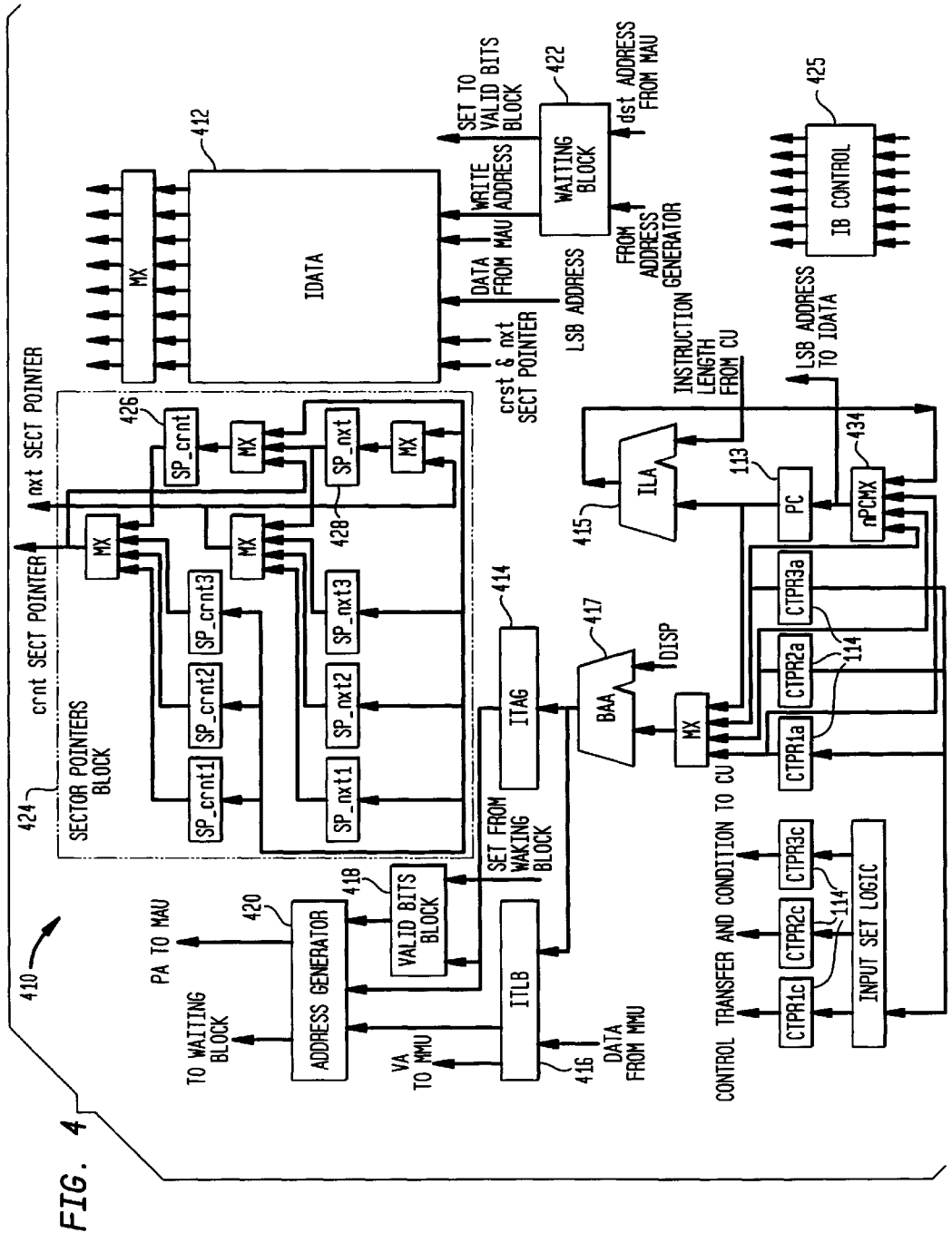
FIG. 4 is a schematic block diagram showing an instruction buffer of the CPU shown in FIG. 1.

Referring to FIG. 4, the instruction buffer 110 includes the instruction cache 410 with an instruction memory 412 and an instruction tag memory 414, an instruction translation lookahead buffer (ITLB) 416, the program counter 116, the control transfer preparation registers (CTPR) 414, the block address adder 417, the instruction length adder 415, a valid bit unit 418, an address generator 420, a memory response waiting unit 422, a sector pointers unit 424, and an instruction buffer control unit 425. The instruction buffer 410 fetches eight words into the instruction register 121 in each clock cycle, including the execution of control transfer instructions (CTI). Two types of control transfer instructions are defined, including control transfer preparation instructions (CTPI) and control transfer execution instructions (CTEI). CTPI execute using the special control transfer preparation registers (CTPR) 114.

In one embodiment, the instruction memory 412 has a size of 2048 33-bit instruction syllables and is divided into eight independent modules, each having a read port and a write port. The module number (0:7) corresponds to bits [4:2] of the program counter 113. In one clock cycle, the instruction memory 412 writes four 66-bit values and reads eight 33-bit values to the instruction register 121. The maximum number of words in an instruction is eight, each of which is read from a different module of the instruction memory 412.

The instruction memory 412 includes sixteen sectors, each containing eight blocks. A sector is an element of the instruction cache 410 that is associatively addressed so that an entry in the instruction tag memory 414 corresponds to a sector number in the instruction memory 412. A block is an element of instruction code which is filled from memory. Each memory access for instruction code causes a block fill with a valid bit corresponding to each block.

The instruction buffer 110 performs two principal functions, (1) a fill of program code fragments from memory into instruction memory 412 preliminary to a transfer of control to the fragments, and (2) code reading from the instruction memory 412 to the instruction register 121 as the program counter 113 changes.

The fill of program code fragments to instruction memory 412 is initiated by a hardware linear prefetch operation and by a software control transfer preparation instructions.

Figure 5:
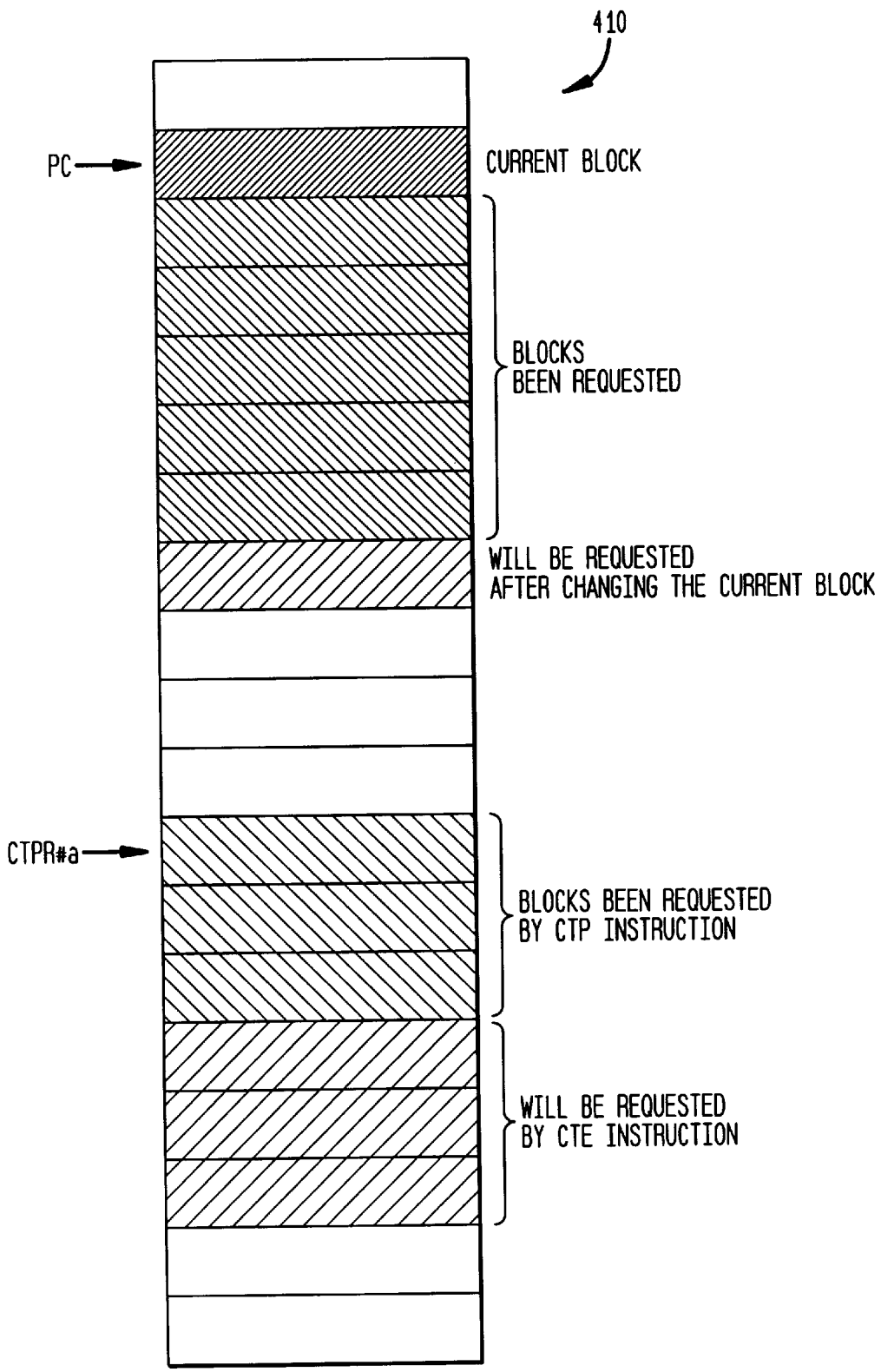
FIG. 5 depicts a graphic view of an instruction code fill method of filling the instruction cache.

Referring to FIG. 5, a graphic view of an instruction code fill method of filling the instruction cache 410 is illustrated. The code fill is continuous with the code filled from a current block not exhausted until the next block is received from memory. The average memory access time is 12 clock cycles and the average instruction length is about six words so that five blocks of reserve instruction code is buffered. When the current block is exhausted, a block five blocks subsequent in the memory is checked and, if not available, reading from memory is requested. For a CTPI instruction, the availability of three blocks in the instruction cache 410 is determined and the code reserve necessary for continuous decoding is issued immediately after the transfer and the Array Prefetch Buffer (APB) 135 is activated to being an array prefetch operation.

Data from the control unit 120 is transferred to registers A and C of the control transfer preparation registers (CTPR) 114. The associative instruction buffer memories, instruction tag memory 414 and instruction translation lookahead buffer (ITLB) 416, are scanned during a block fill by the contents of the program counter 113 for an array prefetch or by the contents of the CTPR for a CTPI instruction.

If an address is found in the ITLB 416, an event called an "ITLB hit", one of three conditions occurs as a result of the scan of the ITLB 416 and the block valid bits. First, the sector including the target block is not found, called a "miss" of the instruction tag memory 414, in which case a new line is allotted in the instruction tag memory 414 and written with attributes including a context, an address, a physical or virtual address. The line valid bit is set to 1, valid bits for blocks of the sector are cleared and a request to memory for the target block is issued. Second, an appropriate sector is held in the instruction cache 410, but the target block is not yet filled so that the instruction tag memory 414 is "hit" and the valid bit is 0. A request to memory for the target block is issued. Third, the target block is found in the instruction cache 410 so that the instruction tag memory 414 is hit and the valid bit is 1. In all three conditions, a sector pointer corresponding to the number of the compared line for a hit or set by a replacement algorithm for a miss is placed in the sector pointers unit 424. The sector pointers unit 424 includes two sector pointer registers corresponding to the register program counter and to each CTPR register. Specifically, these registers are a sector pointer (SP) current sector register 426 for storing the current sector number and an SP next sector register 428 for storing the next sector number. During the scan of the instruction tag memory 414 and the block valid bits, the least significant bits of the block address and the displacement are examined to determine whether the block is in the current sector or the next sector. The scan result is written to the corresponding register for the CTPR or PC that is scanned. The sector pointers are used to read data from the instruction memory 412 to the instruction register 121.

The waiting unit 422 controls writing of data from memory and setting of valid bits. The instruction buffer control unit 425 performs an associativity scan control operation for operations executed along a linear path and CTP instruction execution, delivery of locks to the CPU sector pointers unit 424, and memory access control.

The instruction tag memory 414 includes one scan port (not shown) and access collisions to the scan port are executed according to priority. First priority requests are requests for an array prefetch. Second priority requests select target, or "zero" blocks with a 0 control transfer preparation instruction (CTPI) displacement. Third priority requests select "first" blocks with a 1 CTPI displacement. Minimum priority requests select "second" blocks with a 2 CTPI displacement. The priority between control transfer preparation registers (CTPR) is determined by the CTPI decoding order in the CPU control unit 120.

Control transfer preparation is executed in the pipeline in two clock cycles. In the first clock cycle, the transfer address and the control data are stored to the CTPR. In the second cycle, if the block is hit in the instruction cache 410, the segment number is stored to the corresponding register sector pointer. In a general case, checking of the availability of one block in the instruction cache 410 is performed in one pass through the pipeline. If the blocks requested by the preparation are held in the instruction cache 410, in one sector, then all valid bits are scanned in one clock cycle.

In some embodiments, the data replacement algorithm in the instruction cache 410 is circular and holds resident the current CTPR sectors and the prepared CTPR sectors. The prepared CTPR sectors are sectors for which execution is allowed.

The instruction buffer 110 supports operations using both virtual and physical addressing. Standard SPARC (SPARC V9 ISET) address attributes including context, globality and privilege attributes are stored in the ITLB 416. If an appropriate virtual address is not available in the ITLB 416, the organization of the search and writing, to the ITLB 416 is postponed until instruction code is imminently used.

Figure 6:
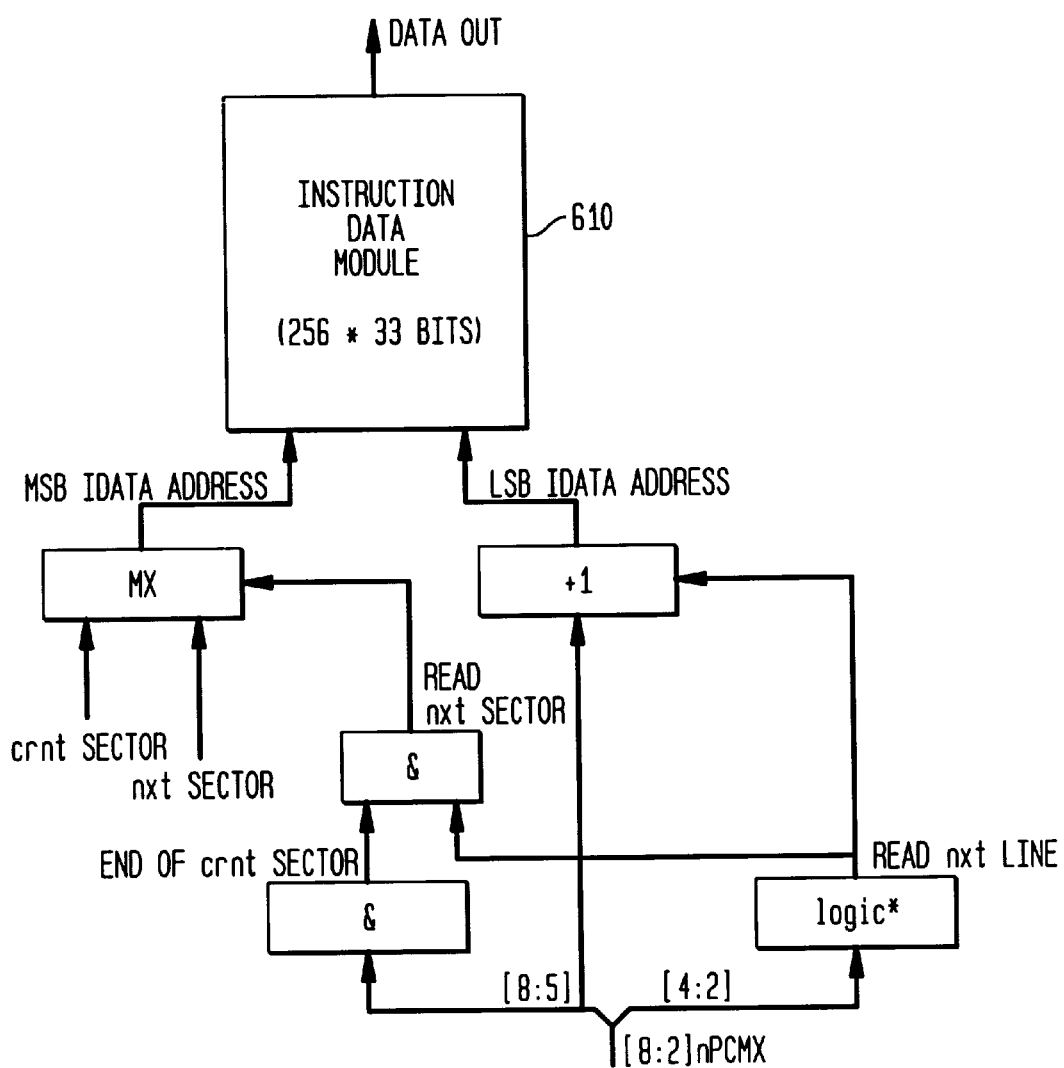
FIG. 6 is a schematic block diagram showing a circuit for generating a module address in an instruction memory.

Referring to FIG. 6 in conjunction with FIG. 4, a schematic block diagram illustrates a module in the instruction memory 412 for generating module addresses. In the case of reading of instruction codes from the instruction memory 412 to the instruction register 121, for operations progressing in an incremental numerical sequence the next instruction address is a result of the addition of the value in the program counter 113 and the instruction length adder (ILA) 415. When a control transfer execution instructions (CTEI) is executed with a transfer occurring, the address of the next instruction is the value of the corresponding control transfer preparation register A (CTPR#a). The next instruction is issued by a multiplier nPCMX 434. The current sector number and bits [8:2] of the multiplier nPCMX 434 form the effective address of the next instruction. Reading of the next instruction from the instruction memory 412 and generation of an address occur in the same clock cycle.

A wide instruction is read from different lines in the instruction memory 412 and into different sectors. Similarly, a read address is issued for every module of the instruction memory 412 on the base of the least significant bit of the multiplier nPCMS 434. Read addresses of the next line for every module in the instruction memory 412 are issued as directed by bits [4:2] of the nPCMX 434. If the next line is to be read, then one is added to bits [8:5] of the nPCMX 434 and the result is the least significant bit of the effective address for the module 610 of the instruction memory 412. At the same time, an attribute of the last line of the current sector is formed based on bits [8:5] of the nPCMX 434. If a next line is read and the current line is the last line of the current sector, then the number of the next sector is selected as the most significant bit of the effective address in the instruction memory 412.

When a sector boundary is crossed along an incremental numerical sequence, the sector pointer register $SP_{13}$ next is written to the sector pointer register SP_current. When the control transfer execution instruction (CTEI) is executed and if the transfer occurred, the corresponding sector pointer numbers, $SP_{13}$crnt# and $SP_{13}$ next# are written to the respective registers $SP_{13}$ crnt and $SP_{13}$ next.

Figure 7:
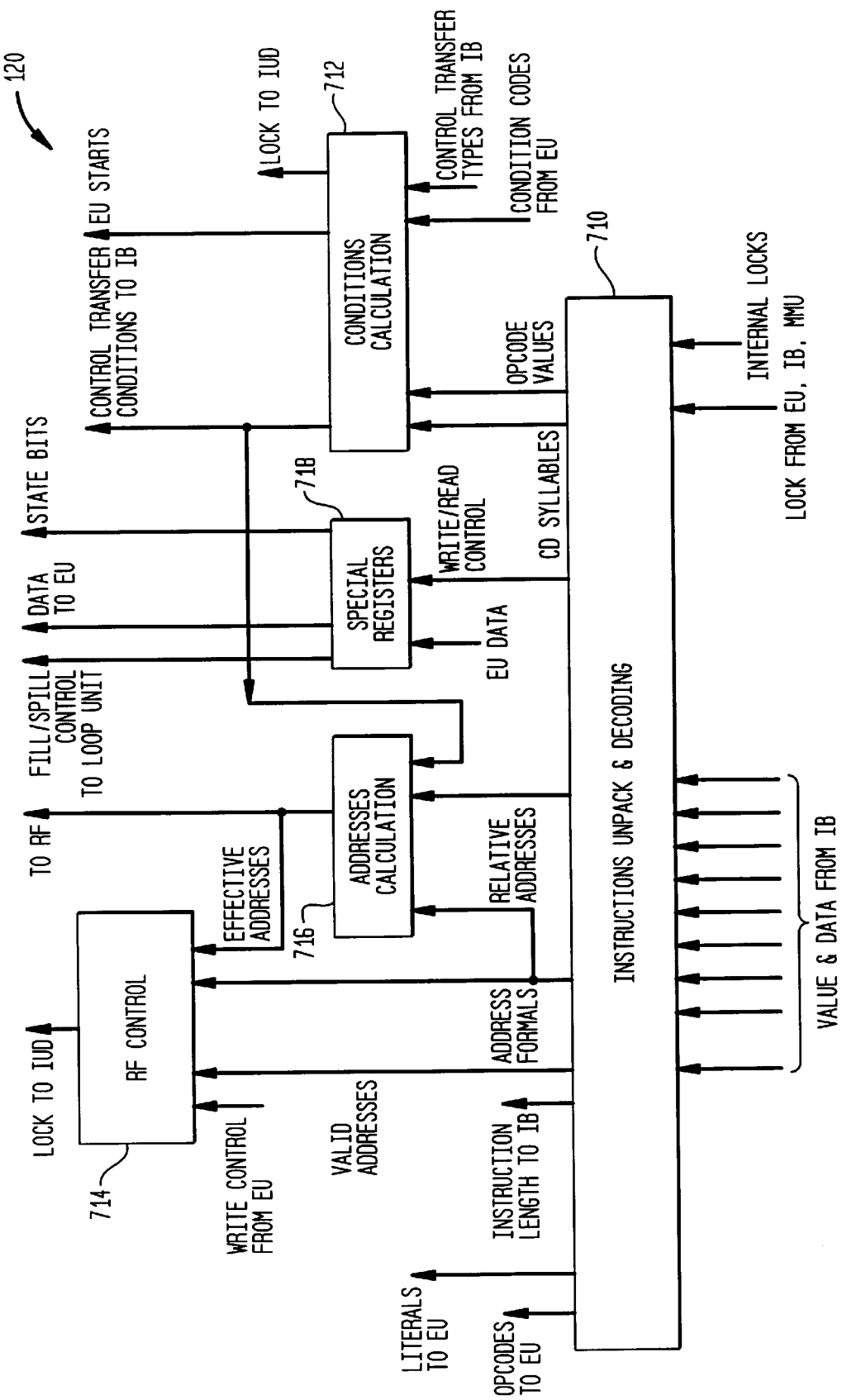
FIG. 7 is a schematic block diagram which illustrates an embodiment of the control unit.

Referring to FIG. 7, a schematic block diagram shows an embodiment of the control unit 120 which directs the instruction flow and generates control signals to implement the instruction flow. The control unit 120 may start all execution units in every clock cycle. The control unit 120 performs numerous functions including transformation of wide instructions from a packed representation to an unpacked format and distribution of instructions among instruction units. The control unit 120 also issues start signals initiating arithmetic channels, logical channels and loop channels. The control unit 120 reads operands from the register file 130, controls the register file 130 and calculates addresses for the register file 130. The control unit 120 controls input operand multiplexers for the execution units and executes instructions of the control unit including control transfer instructions and instructions that modify the register file base, loop variables, and CPU registers. The control unit 120 performs trap entry and controls locking of instruction decoding and execution unit starts.

Figure 8:
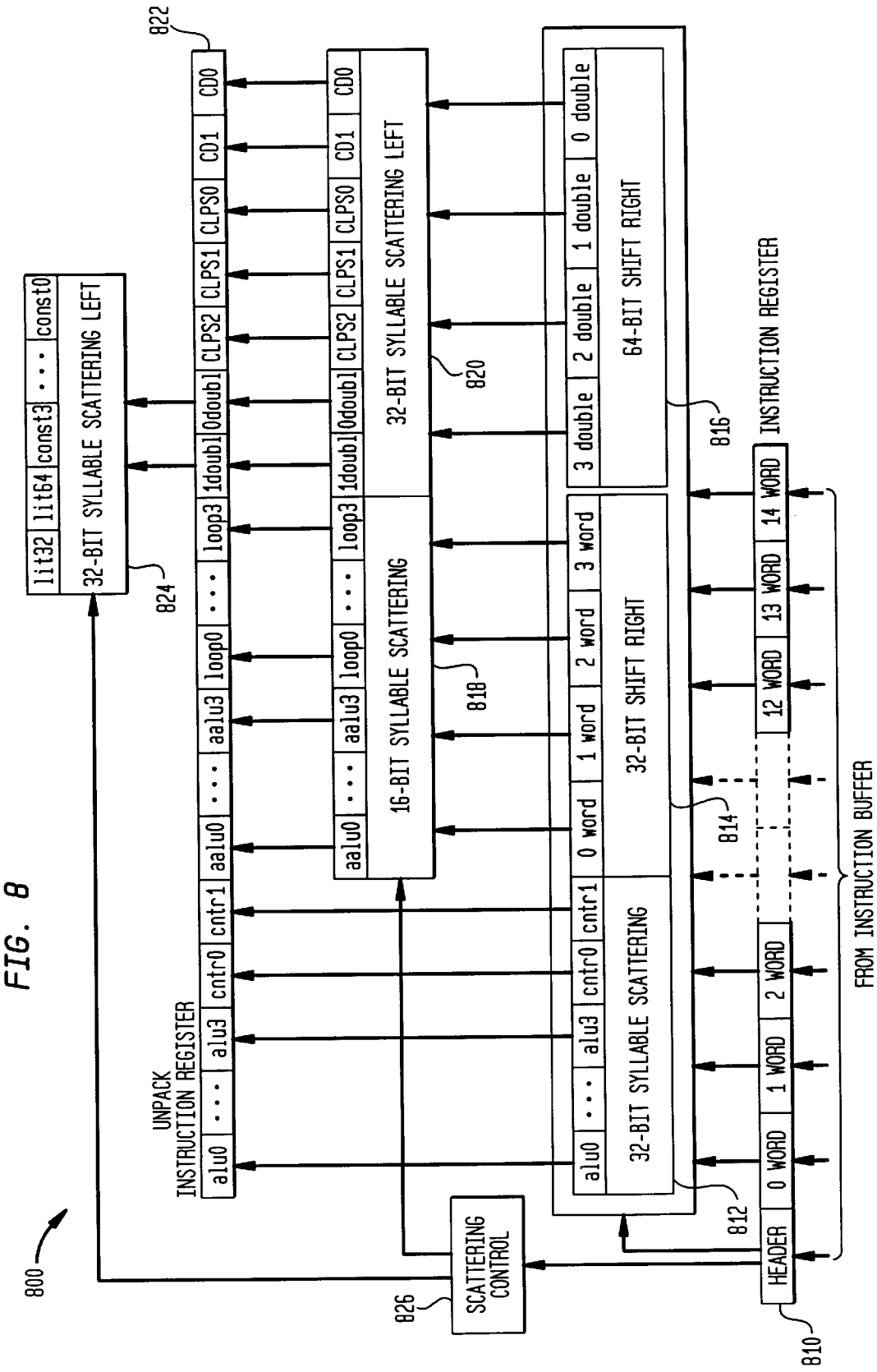
FIG. 8 is a schematic block diagram showing an embodiment of an unpack decode unit.

The control unit 120 has several functional blocks including an instruction unpack and decoding block 710, a conditions calculation block 712, a register file control block 714, a register file address calculation block 716, and a special registers block 718. An unpack decode unit 800, which is shown in FIG. 8, performs several functions including scattering of instructions stored in the instruction register 810, computing the length of a current instruction, issuing a control transfer target address during preparations for a control transfer, issuing literal fields for arithmetic and logical channels and loop channels, controlling writing to the processor registers, multiplexing the data read from the processor registers and literals to arithmetic logic unit buses, and issuing valid bits of addresses in the register file 130 allowing for the register format. The conditions calculation block 712 performs multiple functions including calculation of logic predicates from condition codes, calculates conditions for conditional mode operation, and calculates conditions for control transfer execution control (CTEC).

Referring to FIG. 8, a schematic block diagram shows an unpack decode unit 800 which includes an instruction register 810, a 32-bit syllable scattering circuit 812, a 32-bit shift right circuit 814, a 64-bit shift right circuit 816, a 16-bit syllable scattering circuit 818, a 32-bit syllable scattering left circuit 820, an unpack instruction register 822, a second 32-bit syllable scattering left circuit 824 and a scattering control circuit 826.

Each wide instruction contains a header which defines wide instruction structure and a few 64-bit words containing independent operations for parallel execution. The 16-bit and 32-bit syllables are used for designating the operations to be executed. Syllables of a wide instruction are grouped into three groups for parallel unpacking.

Instructions are fetched from instruction buffer 410 into the instruction register 810 with the header of the instructions located on left. The instruction register 810 holds the header and fifteen 32-bit instruction words and transfers the instruction words to 32-bit syllable scattering circuit 812, 32-bit shift right circuit 814 and 64-bit shift right circuit 816, using header information to control the transfer.

A first syllable group includes up to four arithmetic logic syllables alu0–alu3 and up to two control syllables cntr0–cntr1 and is located at the beginning of the wide instruction. The first syllable group is scattered by 32-bit syllable scattering circuit 812 and is transferred to an unpack instruction register 822.

A second syllable group has only 16-bit syllables, including up to four additional arithmetic logic syllables aal0–aal3 and up to four loop syllables loop0–loop3 loop3. The second syllable group is located in the wide instruction middle following the first syllable group. The second syllable group is shifted by a 32-bit shift right circuit 814, scattered by a 16-bit syllable scattering circuit 818, and transferred to an unpack instruction register 822.

A third and final syllable group includes up to two condition syllables cd0–cd1, up to three calculate logical predicate syllables clps0–clps2, and up to four literal syllables lit0–lit3. The third syllable group is located at the end of the wide instruction and is ordered from right to left. The third syllable group is shifted by a 64-bit shift right circuit 816, scattered by 32-bit syllable scattering left circuit 820, and transferred to unpack instruction register 822. The 32-bit syllable scattering left circuit scatters 32-bits, not including literal syllables.

Literal syllables, which are packed as 64-bit double words 0doub1–1doub1, are scattered by a second 32-bit syllable scattering left circuit 824 after passing through the unpack instruction register 822. The second 32-bit syllable scattering left circuit 824 forms a 32-bit literal value lit32 for ALU1, a 64-bit literal value lit64 for ALU3, and four 32-bit literal values const0–const3 for AAC0–AAC3.

The 16-bit syllable scattering circuit 818, the 32-bit syllable scattering left circuit 820, and the second 32-bit syllable scattering left circuit 824 are controlled by a scattering control circuit 826.

Figure 9:
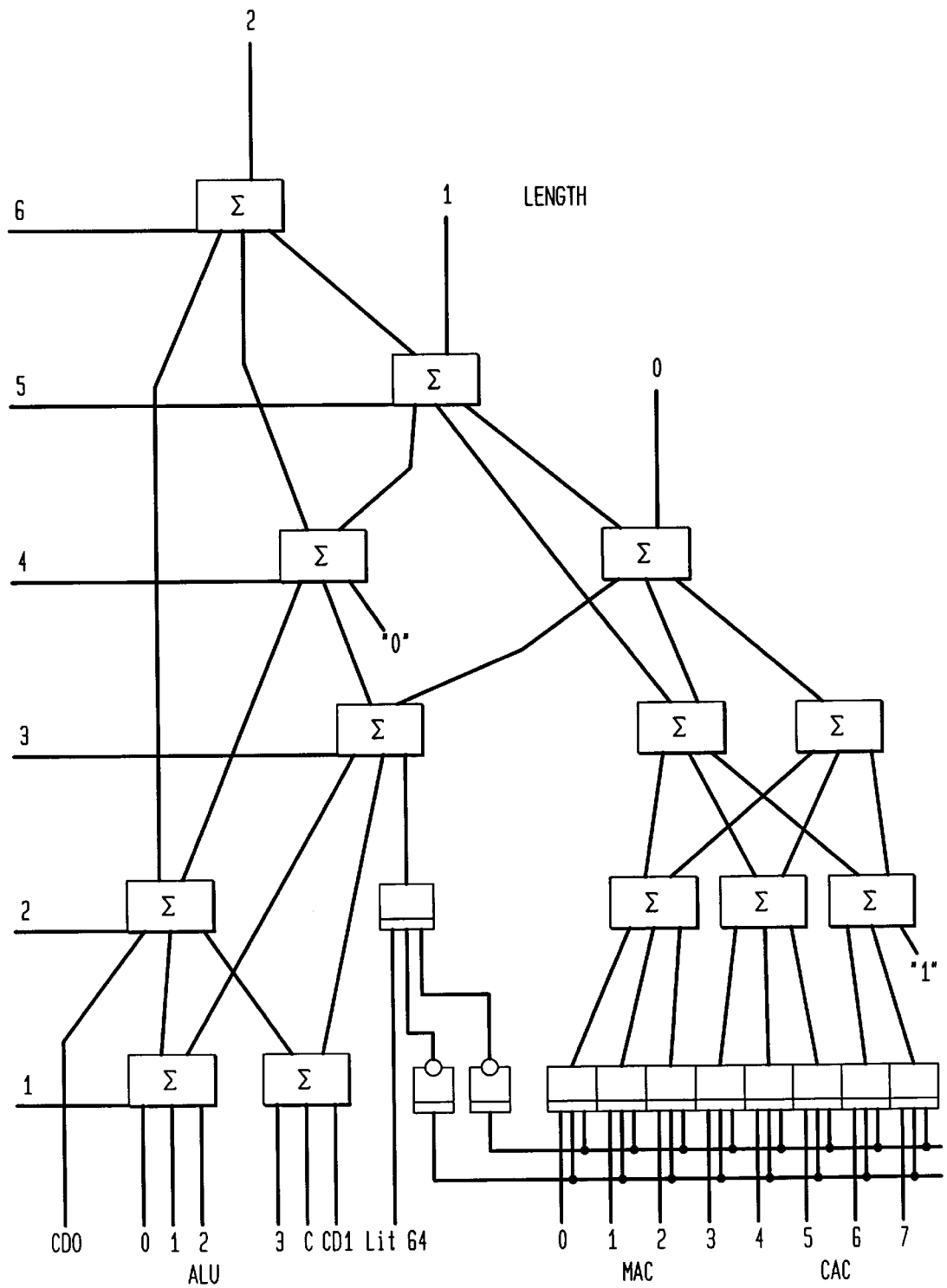
FIG. 9 is a graphic view of a method of computing the length of an instruction as performed by the unpack decode circuit shown in FIG. 8.

Referring to FIG. 9, a graphic view depicts a method of computing the length of an instruction as performed by the unpack decode circuit shown in FIG. 8. The length of an instruction in the instruction register 810 does not exceed eight words and is computed as directed by mask bits in the instruction header. A length value of seven corresponds to an instruction length of eight words. The control transfer target address for a branch or call operation is the sum of the current instruction program count and the displacement from the control syllable. For a jump long (JUMPL) operation, the control transfer target address is calculated by ALU0.

Figure 10:
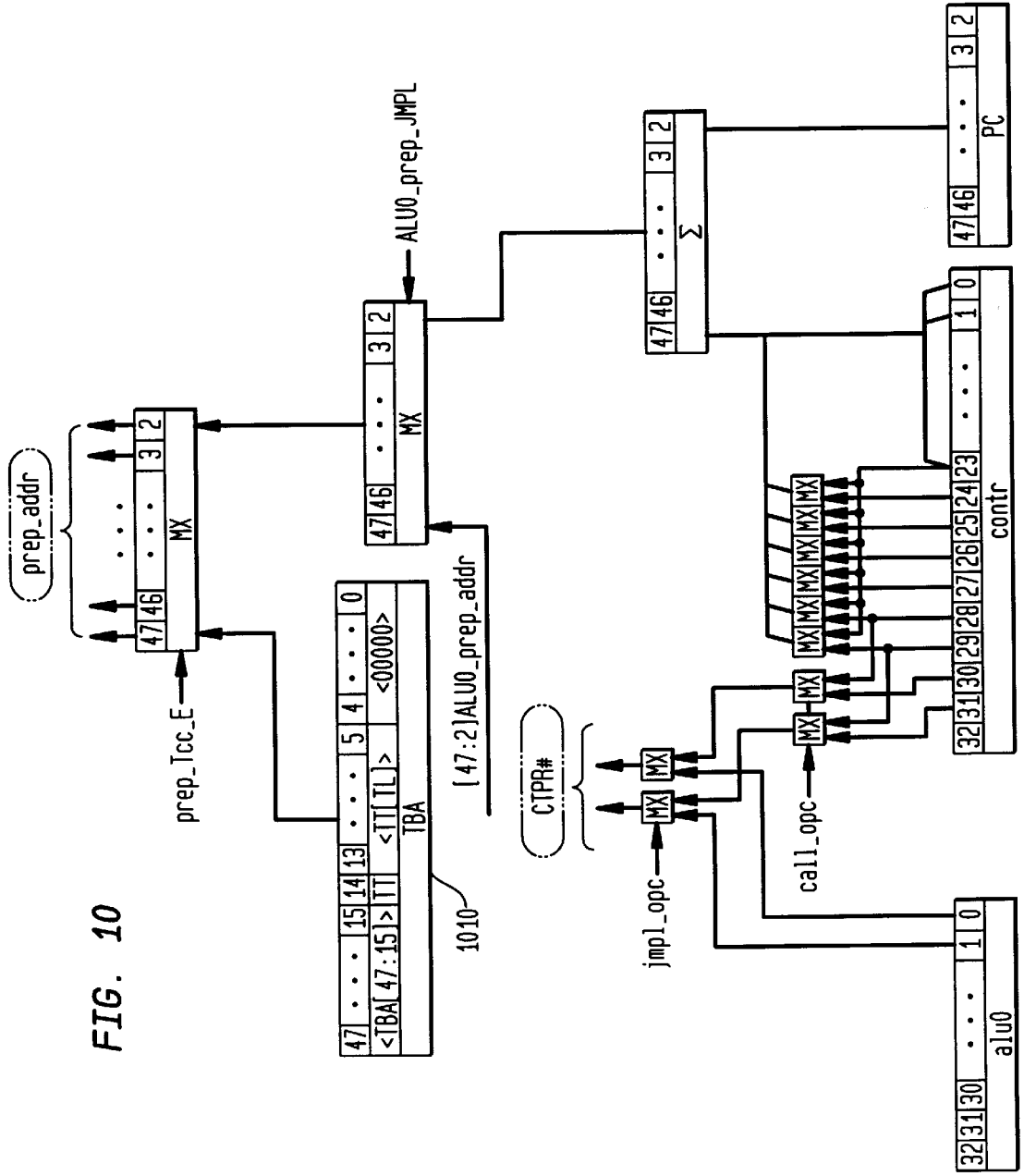
FIG. 10 is a block diagram which illustrates a method of generating a control transfer preparation (CTP) address.

Referring to FIG. 10, a block diagram illustrates a method performed in preparation for a conditional jump instruction for determining a control transfer target address based on bits 0 and 1 of ALU0, the control syllable and the program counter. Various bits of the ALU0, control syllable and program counter are multiplexed and summed and offset by base trap register (TBA) 1010 to generate a control transfer target address and a preparation register (CTPR#). The control transfer target address is obtained by writing a trap number from the instruction to bits 5:13 of a base trap address register (TBA) 1010.

Figure 11:
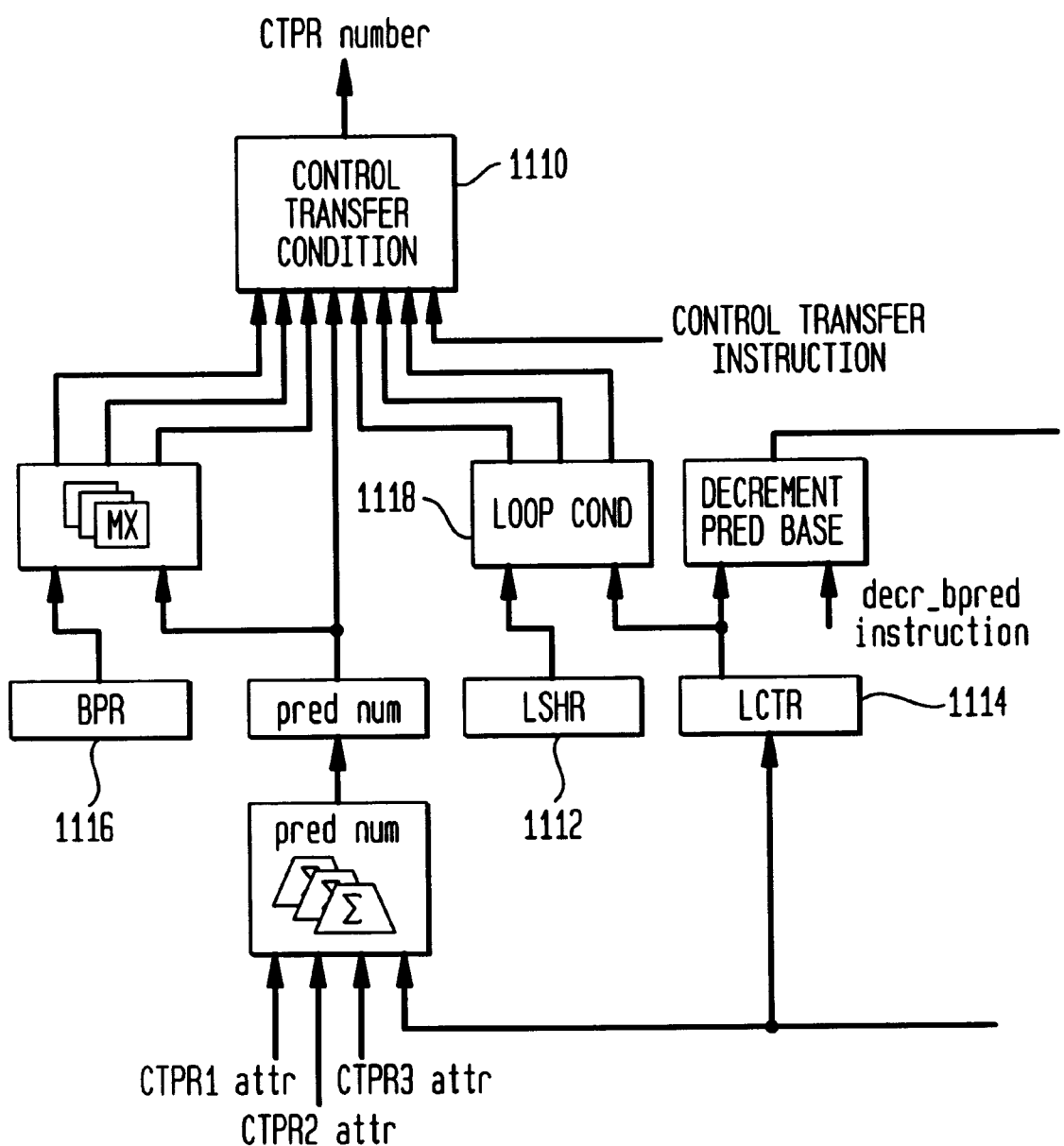
FIG. 11 illustrates a schematic block diagram including structures that interact to derive a control transfer condition.

Referring to FIG. 11, a schematic block diagram illustrates structures that interact to derive a control transfer condition including a control transfer condition calculation block 1110. The control transfer condition is derived separately for each CTPR and is determined from the LSHR1112, LCTR 1114 and PF 131. The condition type is set by the CTPR.TYPE field in one of four states including an unconditional transfer state, a control transfer by the value of the predicate from the PF 131 state, a control transfer by the loop event 1118 state, and a control transfer by the value of the predicate from the PF 131 and by the loop event 1118 state. One wide instruction may contain a multiway jump.

Figure 12:
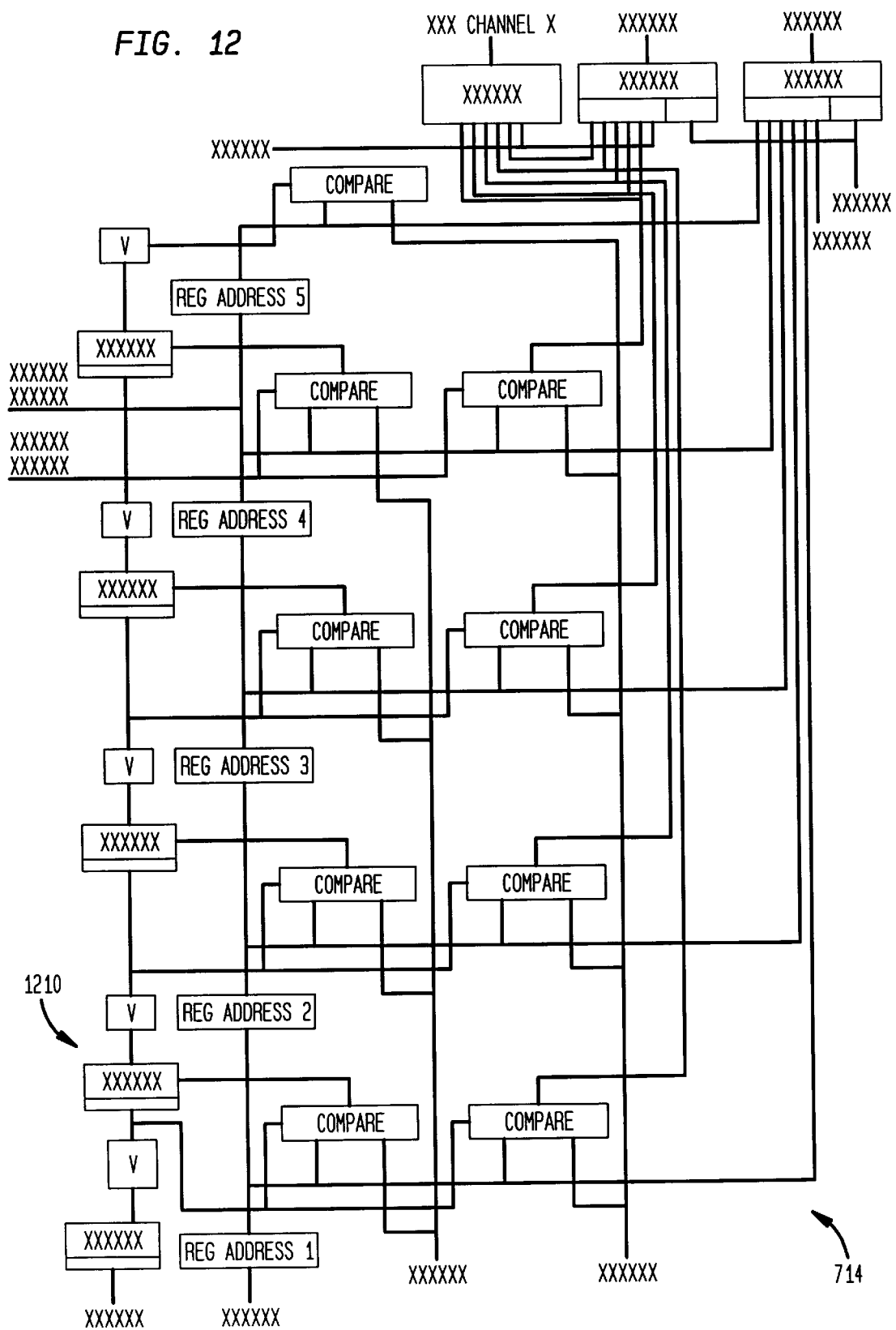
FIG. 12 is a schematic block diagram which illustrates an embodiment of a register file control circuit.

Referring to FIG. 12, a schematic block diagram illustrates an embodiment of a register file control block 714. During the decode (D) phase of the instruction execution cycle, the register file control block 714 receives valid bits, formats and effective addresses of operands in the register file 130 from the unpack decode unit 800. During the read (R) phase, the register file control block 714 reads operands from the register file 130 subsequent to a data collision.

Destination addresses and associated valid bits are passed to a data address pipeline 1210 and are moved synchronously with the movement of data in the movement in the arithmetic and logical channels ALU 150. When issuing a result, the ALU 150 reports to the register file control block 714 the duration of an operation in clock cycles, a number that corresponds to the level of the data address pipeline 1210. This address is selected to execute a write to the register file 130.

The length of the data address pipeline 1210 is determined by the set of execution units in the ALU 150 and the operation execution time.

The correct execution of read and write operation sequences, including a write "antidependency" problem occurring when a destination register is reused in a subsequent instruction before the completion of execution of the previous instruction, is solved using the register file comparison circuits 1220. All addresses from the instruction (rs, rda and rdv) of all syllables are compare to rd of all instructions that are currently processed in the channels. During the comparison of any read address with any rd in the channel, an operand for reading is not ready and the lock is issued, delaying execution of the current and subsequent instructions. For a comparison of any rd from the instruction with rd in an arithmetic channel, the corresponding rd valid bit in the channel is cleared.

The memory access channels 1212 solve these problems in two ways. First, up to the time of address delivery to the memory, in particular the three clock cycles after D phase, the sequence of read operations and write operations is correct and the antidependency problem is solved as in the arithmetic channels. For requests to memory, every register file 130 has two valid bits, one bit for each half of the word, which are cleared for a memory request to data and set to 1 when the data from memory is written. The addresses from the instruction are checked for the corresponding register valid bit. If at least one valid bit is equal to zero, a signal which locks the execution of an instruction and the subsequent instructions, is issued. A bypass circuit 1214 is included to reduce the time for moving operands from the ALU 150 and the data cache 180. When a read address is compared to a write address, corresponding data from any ALU 150 output terminal or data cache 180 output terminal are multiplexed to any ALU 150 input terminal before the operand is written to the register file 130.

Figure 13:
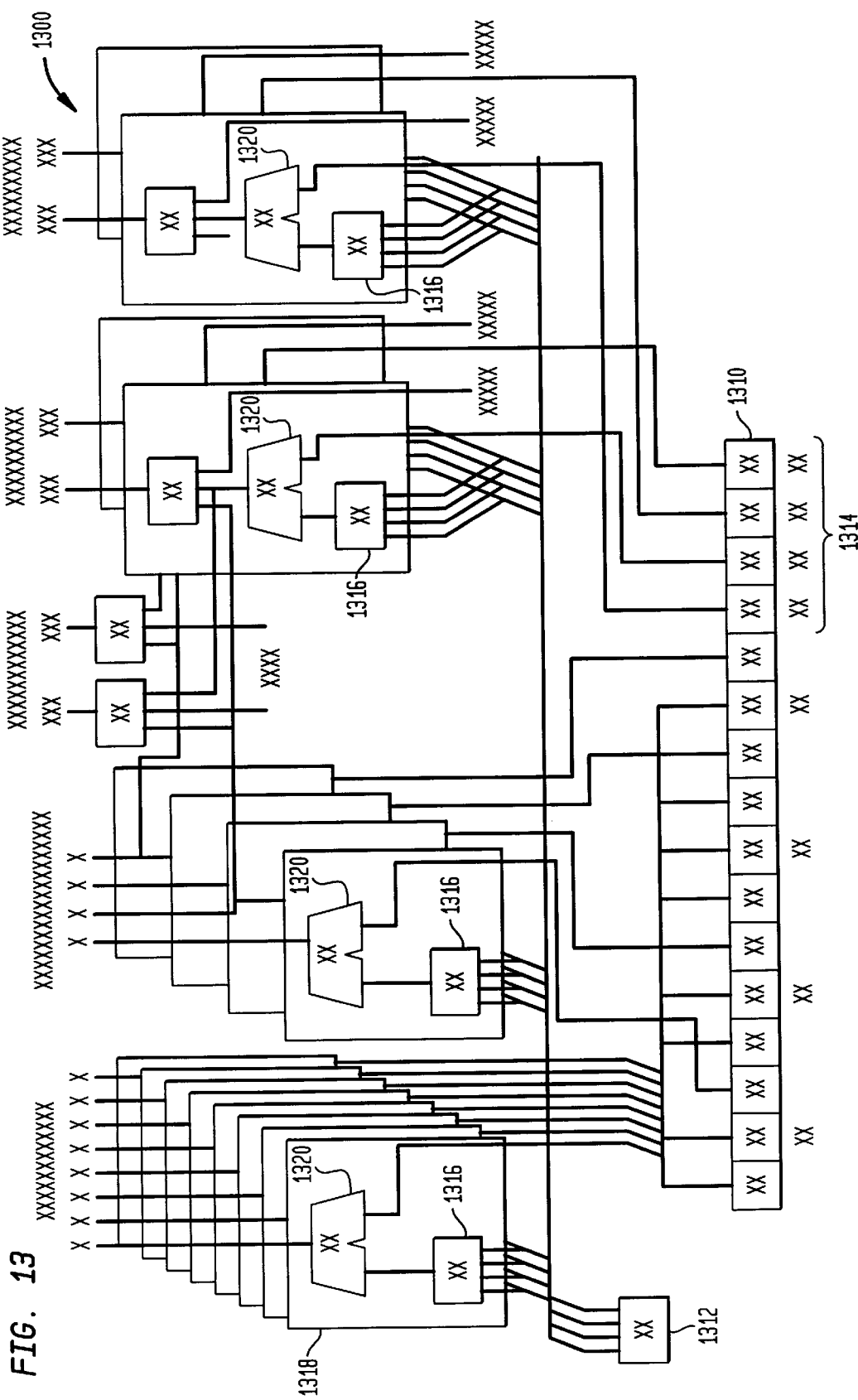
FIG. 13 is a schematic block diagram showing an embodiment of a register file address calculation circuit.

Referring to FIG. 13, a schematic block diagram shows a single-port part of the register file address calculation circuit 716 which calculates effective addresses in the register file 130 by basing an address from the instruction in respect to one of four bases allowing for crossing of the boundaries of based areas BR1 and BR2 and of the register file 130. Paths of unpacked instruction addresses passing to the register file 130 and to the destination addresses pipeline 1210 include r0–r7 read addresses for the ALU and r8–r9 read addresses for store operations. The r8–r9 ports handle store operations of scalar and vector channels and hardware spill of the register file 130.

Addresses for the operation results, which may include eight addresses, are divided into two groups, specifically destination addresses for the ALU results (rdd0–rda3) and destination addresses for scalar and vector load operations (rdm0–rdm3). In the first and third channels, scalar and vector load and store operations are mutually exclusive so that addresses rdm1 and rdm3 destination addresses for scalar and vector channels are shared.

A single-port register address calculation circuit 1300 includes a register CWP 1310, and a parameter base (Cwpar_new) 1312 and loop bases (BR#.cur) 1314 which are relative pointers that are based on the register CWP 1310. The loop bases (BR#.cur) 1314 allow for decrementing and cycling and include a base multiplexer 1316 which is controlled by the number of base bits of the corresponding instruction field. The loop bases 1314 also includes an address transformation circuit 1318 and a base adder 1320 for applying operand format data and an address cycling control circuit 1322 if the address exceeds the register file size.

For single format operands, the address is passed to the register address calculation circuit 1300 unchanged. For double format operands, the least significant bits of the address are moved to the extreme left position and the extreme right bits are zero-filled.

Figure 14A:
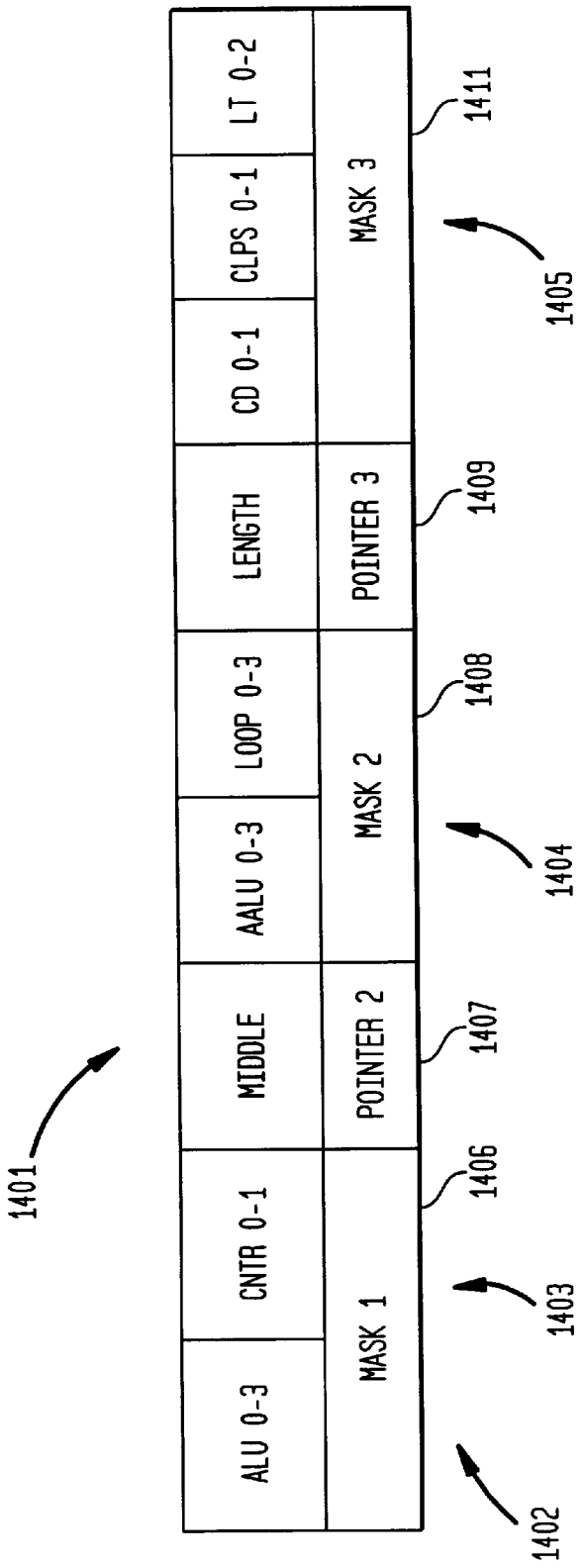
FIGS. 14A and 14B are graphical representations of a format for storing wide instructions in a packed format in accordance with two respective embodiments of the present invention.

Referring to FIG. 14A, a graphical representation shows a format 1401 for storing wide instructions in a packed format. A header 1402 describes a structure of a wide instruction using three group descriptors including an initial group descriptor 1403, a middle group descriptor 1404, and a final group descriptor 1405.

A group descriptor typically includes a pointer and a mask. The syllable order for the initial group descriptor 1403 is from left to right. The initial group descriptor 1403 includes only a mask 1406 since the pointer for the initial group descriptor 1403 is always equal to 1. The mask 1406 for the initial group descriptor 1403 includes a mask for the four arithmetic logic syllables alu0–alu3 and two control syllables cntr0–cntr1. The mask 1406 has four bits which control transfer of a corresponding four arithmetic logic syllables alu0–alu3 for masking the four Arithmetic Logic Units (ALU0–ALU3) 140. The mask 1406 has two bits which control transfer of a corresponding two control unit syllables cntr0–cntr1 for masking in the control unit (CU) 120. The CU 120 performs a control transfer prepare operation using one syllable (cntr0) or two syllables (cntr0–cntr1). The second syllable cntr1 is used when a long literal value is used for representing a target address. A code of '00' for the cntrl0–cntrl bits designates a no-operation (NOP) for the control transfer preparation operation of the CU 120.

The middle group descriptor 1404 includes a pointer 1407 and a mask 1408. The syllable order for the middle group descriptor 1404 is from left to right. The middle croup pointer 1407 is a "middle" field which is equal to the number of omitted syllables in the initial group descriptor 1403. The mask 1408 for the middle group descriptor 1404 includes a mask for four additional arithmetic logic syllables aal0–aal3 and four loop syllables loop0–loop3. All middle group 1404 syllables have a 16-bit length. The mask 1408 has four bits which control transfer of a four arithmetic logic syllables aalu0–aalu3 for masking the four Arithmetic Logic Units (ALU0–ALU3) 140. The mask 1408 has four bits which control transfer of a corresponding four loop syllables loop0–loop3 for masking the four Array Access Channel Execution Units (AAC0–AAC3) 160.

The final group descriptor 1405 includes a pointer 1409 and a mask 1411. The syllable order for the final group descriptor 1405 is from right to left. The final group pointer 1409 is a "length" field which defines both a location of the first syllable of the final group descriptor 1405 and a final syllable location in the wide instruction. Consequently, the final group pointer 1409 is equal to the wide instruction length minus 1. The final group mask 1411 includes two condition bits cd0–cd1, two calculate logical predicate bits clps0–clps1, and three literal bits lt0–lt2. The condition bits cd0–cd1 define a number of condition syllables (cd0–cd1) transferred to the Calculate Condition Unit (CCU) 133. The Calculate Condition Unit (CCU) 133 performs up to two Route Logical Predicate operations using one syllable (cd0) or up to four Route Logical Predicate operations using two syllables (cd0–cd1). A code of '00' for the cd0–cd1 bits designates a no-operation (NOP) for the Route Logical Predicate operation of the CCU 133.

The two logical predicate bits clps0–clps1 define a number of calculate logical predicate syllables (clps0–clps2) transferred to the Calculate Condition Unit (CCU) 133. The Calculate Condition Unit (CCU) 133 performs three types of operations using Predicate File (PF) 131 data as primary operands. The Predicate File (PF) 131 operands are order-specific. Operations defined in the clps0 syllable use only Predicate File (PF) 131 data as operands. Operations defined in the clps1 syllable use either Predicate File data or results of operations in the clps0 syllable as operands. Operations defined in the clps2 syllable use either Predicate File data, results of operations in the clps0 syllables, or results of operations in the clps1 syllables as operands. A code of '00' for the clps0–clps1 bits designates a no-operation (NOP) for the Calculate Logical Predicate operations of the CCU 133.

Literal syllables lt0–lt2 are order-specific. The mask field 1411 specifies a code defining, literal syllables lt0–lt03 usage. Bits lt0–lt2 define a number of literal syllables for the Arithmetic Logic Units (ALU1 and ALU3) 140. The lt2 bit controls transfer of the lt0 syllable as a 32-bit literal value to ALU1. The lt0–lt1 bits define a number of literal syllables for ALU3. If bit lt2 is equal to 0, then the lt0–lt1 syllables define a literal value for ALU3. Otherwise, bit lt2 is equal to 1 and syllables It I and lt2 define the literal value for ALU3. One literal syllable represents a 32-bit value. Two literal syllables represent a 64-bit value. If the mask field 1411 specifies one of these defined encodings, the literal syllables are transferred to ALU1 and ALU3 as defined. Otherwise, literal syllables are transferred to AAC0–AAC3 as defined by the AAC operations. A code of '00' for the lt0–lt1 bits designates a no-operation (NOP) for ALU3.

Pointers illustrated by FIG. 14A are used in four substantially different ways. The initial pointer is implicit in the structure of the header 1402 rather than expressly specified. The middle pointer 1407 specifies the number of syllables that are omitted in the initial group descriptor 1403. The final pointer 1409 expresses the displacement of the final group descriptor 1405 from the beginning of the wide instruction. The final pointer 1409 also expresses the definition of the final pointer 1409 and the instruction length simultaneously.

Masks illustrated by FIG. 14A are used in two different ways. First, the masks 1408 and 1411 express a bit scale in which each bit defines one wide instruction syllable of alu0–alu3, aalu0–aalu3, loop0–loop3, and lt0 of execution units ALU0–ALU3 140 and Array Access Channel Execution Units (AAC0–AAC3) 160. The masks 1408 and 1411 also specify a number of syllables since an execution unit may use different numbers of syllables from a wide instruction (cntr0–cntr1, CD0–CD1, CLPS0–CLPS1, and LT1–LT2. A single mask may include fields which specify both the bit scale and the number of syllables.

Figure 14B:
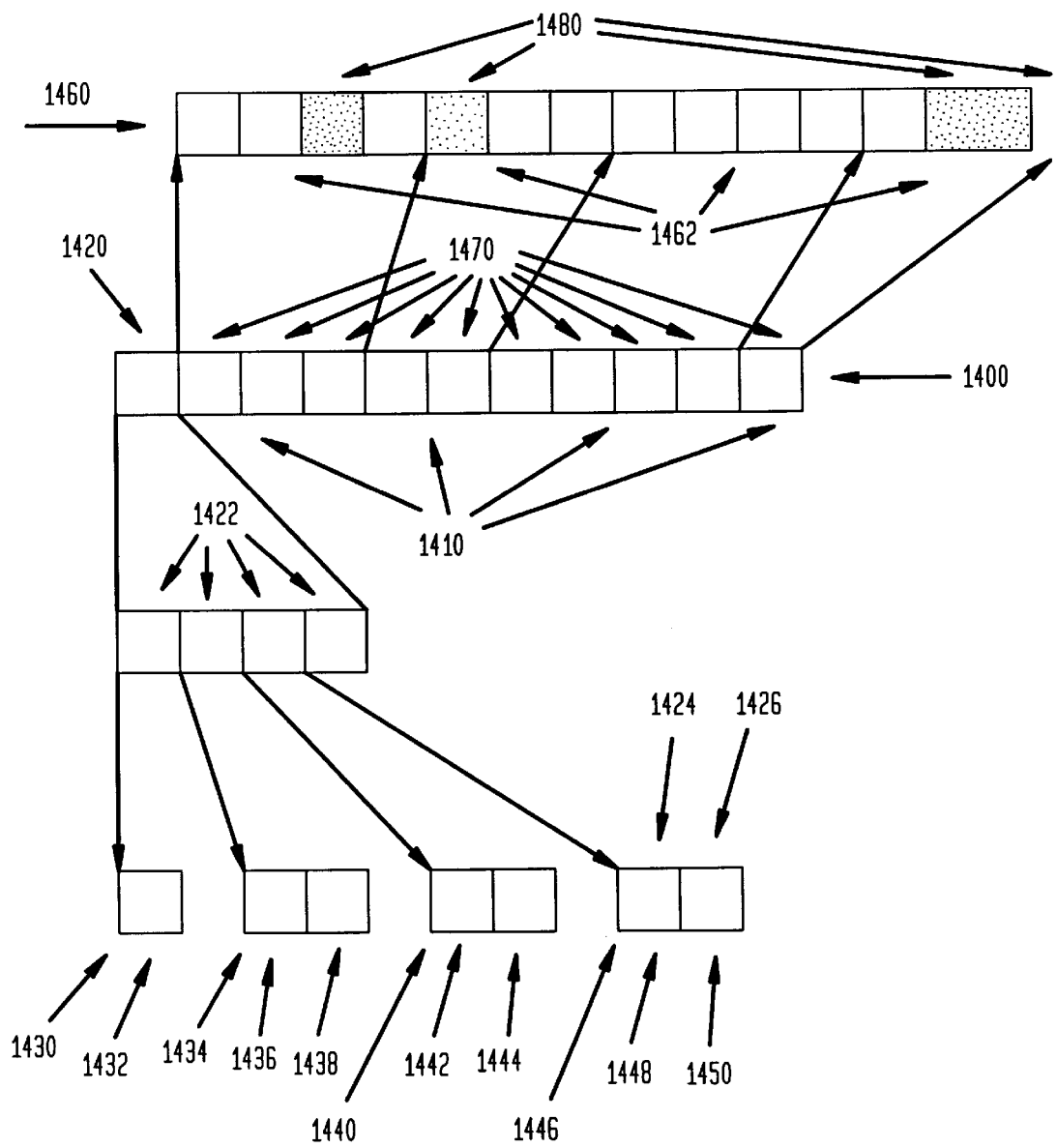

Wide instructions are stored in instruction memory 412 and instruction cache 410 as a plurality of syllables in a packed format shown in FIG. 14B. A syllable is a field of fixed length, for example 16 and 32 bits, which represents one or multiple operations selected from the operation set of the CPU 100. A plurality of wide instructions are accessed from the instruction memory 412 and instruction cache 410 and prepared for execution by the unpack decode unit 800 which unpacks the wide instructions into wide instruction syllables which are directed to the multiple execution units 150.

In the illustrative embodiment, each wide instruction 1400 includes one mandatory syllable 1420 and a plurality of optional syllables 1470. The syllables are 16 and 32 bits in length. Nine types of syllables are defined including a 32-bit mandatory header syllable 1420, a 32-bit loop header syllable, up to four 32-bit arithmetic and logical syllables, up to two 32-bit control syllables, up to four 16-bit additional arithmetic and logic syllables, up to three 16-bit loop syllables, up to four 32-bit literal syllables, up to three 32-bit logic predicates processing syllables and up to two 32-bit conditional syllables. The compiler generates a wide instruction 1400 which includes an arbitrary assemblage of optional syllables 1470. One restriction is imposed. The syllables, if included, are constrained to a prescribed order.

The header syllable 1420 is a mandatory inclusion in the wide instruction 1400 because the header syllable contains information relating to the wide instruction structure that is used for unpacking and decoding of the wide instruction 1400. The header syllable 1420 includes information for controlling the transfer of syllables from a packed wide instruction 1400 to an unpacked representation of the instruction. The header syllable 1420 also includes a designation of the length of the wide instruction 1400.

A loop syllable contains the loop header and one operation for the lowest number array access channel. The loop header contains the mask of loop syllables for array access channels and a description of the operation types.

Arithmetic logic syllables contain operations for corresponding arithmetic logic units. These operations include memory access operations, arithmetic integer or floating-point operations, logical operations, CPU registers access operations, control transfer operations. Additional arithmetic logic syllables contain floating-point second-level operations of combined three argument operations for execution by arithmetic logic units or opcode extension.

Loop syllables contain operations for controlling loop operation modes in array access channels.

Literal syllables are used for generating 32-bit and 64-bit literal values for usage by arithmetic logic units and array access channels.

Logic predicates processing syllables contain operations on logic predicates.

Conditional syllables contain logical predicate computation operations for the control of operation execution in the condition mode for arithmetic logic units and array access channels.

Performance of the CPU 100 is improved by partitioning a wide instruction 1400 into a plurality of syllable groups 1410. Each syllable group 1410 is unpacked separately, independently and generally in parallel with respect to the other syllable groups of a wide instruction via a plurality of independent unpacking blocks including a 32-bit syllable scattering circuit 812 (a first unpacking block), a 32-bit shift right circuit 814, a 16-bit syllable scattering circuit 818 (a second unpacking block), a 64-bit shift right circuit 816, a first 32-bit syllable scattering left circuit 820, and a second 32-bit syllable scattering left circuit 824 (a third unpacking block) in the unpack decode unit 800 shown in FIG. 8 to supply some of the syllables of a plurality of unpacked instruction syllables 1460 to the plurality of execution units EU 150 including, the Calculate Condition Unit (CCU) 133, the four Arithmetic Logic Units (ALU0–ALU3) 140, and the four Array Access Channels (AAC0–AAC3) generally identified as 160.

Unpacking is controlled according to information in the header 1420 syllable of the wide instruction 1400. Packed instruction syllables in the syllable groups 1410 immediately follow the header 1420 with the syllables having a dense packing including, no null syllables. The syllables 1470, when included in a wide instruction 1400, are packed in the syllable groups 1410 in a constant order for all wide instructions 1400. However, the number of syllables in the wide instruction 1400 is variable.

In a typical embodiment, the header 1420 is a first syllable of the wide instruction 1400. The header 1420 defines the structure of the wide instruction 1400 by describing the syllable groups 1410. The wide instruction 1400 includes a fixed number of syllable groups 1410, although one or more of the syllable groups may not include even a single syllable. A syllable group 1410 which does not include a syllable is a null group. The number of syllable groups 1410 corresponds to the number of independent unpacking blocks in the unpack decode unit 800 so that each independent unpacking block is associated with a specific one of the syllable groups 1410. The header 1420 includes a descriptor 1422 of each of the fixed number of syllable groups 1410 so that the descriptors 1422 are defined statically in fixed positions.

A descriptor 1422 describes the syllables in a syllable group 1410 and controls the unpacking function of an independent unpacking block that is associated with the descriptor 1422. Each descriptor 1422 includes a displacement field 1424 and a mask field 1426. In a specific embodiment, the descriptors 1422 have a defined and fixed position in the header 1420. Various different embodiments may include differing numbers of descriptors 1422, and different displacement field 1424 and mask field 1426 definitions.

The displacement field 1424 designates the displacement of a syllable group 1410 with respect to the beginning syllable of the wide instruction 1400, the beginning syllable being the first syllable following the header 1420. The displacement field 1424 is a group pointer (G$_i$ pointer) of a particular group (i), which points to either the beginning or the ending terminal syllable of the group for most syllable groups 1410. In the illustrative embodiment, no displacement field 1424 is included in the header for the first syllable group 1430 since the first group always begins with the first syllable of the wide instruction 1400 following the header 1420. For the final syllable group 1446, the displacement field 1448 designates the ending terminal syllable of the final syllable group 1446 and, therefore, the final syllable of the wide instruction 1400. For other syllable groups 1434 and 1440 which are not the first or last syllable groups, the respective displacement field 1436 and 1442 designates the beginning terminal syllable of the syllable group 1434 and 1440. In general, the displacement field 1424 may be defined to designate either the beginning or the ending syllable of a syllable group 1446 so long as the unpacking block that is associated with the descriptor 1422 is defined or controlled to function consistently with the displacement field definition. In the illustrative embodiment, the displacement field 1448 designates the ending terminal syllable of the final syllable group 1446 to supply in a readable or accessible record the size of the wide instruction 1400. For a null group, the displacement field 1424 may take any value and is, thus, undefined. In the illustrative embodiment, the null group displacement coincides with the next group displacement. The definition and usage of a displacement field 1424 is advantageous for allowing an increased speed and performance of instruction unpacking without introducing the circuit complexity for computing the location of elements in relation to information from the mask field 1426. The usage of the displacement field 1448 of the final syllable group 1446 to designate both the final group displacement and the size of the wide instruction 1400 advantageously conserves storage.

In an alternative embodiment, the displacement field 1424 may be defined to designate a displacement of the number of syllables that are missing in the packed instruction prior to the beginning of a syllable group, rather than a displacement from the beginning of a packed wide instruction. In further alternative embodiment, the displacement field 1424 may be defined to designate a displacement from a syllable group to a next syllable group in an unpacked instruction format. Each of these alternative embodiments utilizes slightly different counting circuitry for implementing an unpacking circuit.

The mask field 1426 controls the transfer of syllables from the wide instruction 1400 to the unpacked instruction syllables 1460 by designating the presence or absence of particular syllables in the unpacked instruction syllables 1460. The mask field 1426 is a group mask ($G_i$ mask) of a particular group (i), which includes one bit for each syllable of an unpacked syllable group 1462 that determines whether the syllable is represented or null (unrepresented) within the unpacked instruction syllables 1460. In the illustrative embodiment, bits of the mask field 1426 set to 1 are loaded with syllables from the wide instruction 1400 and bits set to 0 are null syllables.

In an alternative embodiment, the mask field 1426 may be defined to represent a number of syllables within a group of execution units so long as the order of execution unit usage is constant. For example, the syllables and corresponding execution units may be separated into a functional group such as ALU the four Arithmetic Logic Units (ALU0–ALU3) 140. So separated, the mask field 1426 designates a number of selected execution units within a group that are present in the packed instruction. Thus, if a mask 1426 designates a value of zero, no execution units are present in the packed instruction. A designated mask 1426 value of one designates a single present execution unit, such as ALU0. A designated mask 1426 value of two designates two present execution units, such as ALU0 and ALU2. A designated mask 1426 value of three designates three present execution units, such as ALU0–ALU2. A designated mask 1426 value of four selects all execution units in this example.

The displacement field 1424 and the mask field 1426 are used in combination to control the unpacking blocks, thereby determining the structure of the unpacked instruction syllables 1460. Each unpacking block performs an unpacking function for transferring syllables from a variable packed wide instruction 1400 into a fixed set of syllables of the unpacked instruction syllables 1460. Each unpacking block accesses the descriptor 1422 within the header 1420 to read the displacement field 1424, if available. The first syllable group 1430 does not include a displacement field 1424 and designates the first syllable following the header as the starting syllable. The unpacking block then activates the transfer of a syllable 1470 of the packed wide instruction 1400 to the unpacked instruction syllables 1460 for each bit in the mask field 1426 affirming inclusion of the syllable while failing to transfer a syllable for each bit in the mask field 1426 which does not affirm inclusion. The unpacking block then shifts to the next bit in the mask field 1426 for all bits in the mask field 1426. In the illustrative embodiment, an unpacking block associated with the final syllable group 1446 accesses the displacement field 1448 to designate the final syllable of the packed wide instruction 1400, accesses a mask field 1450 of the descriptor 1446, and activates or deactivates transfer of syllables by passing through the bits of the mask field 1450 in reverse order to appropriately unpack the final group syllables 1462 of the unpacked instruction syllables 1460.

The unpack decode unit 800 may be configured to attain a selected balance of circuit size and complexity, on one hand, and performance. For example, each syllable group 1410 may be defined to include a single syllable to achieve the highest unpacking performance and speed. Alternatively, the entire wide instruction 1400 may be packed into a single syllable group 1410 so that no redundant circuitry is used in the unpack decode unit 800, although unpacking performance is poorest due to the additional time delay imposed for analysis of the mask for the entire wide instruction 1400.

Figure 15:
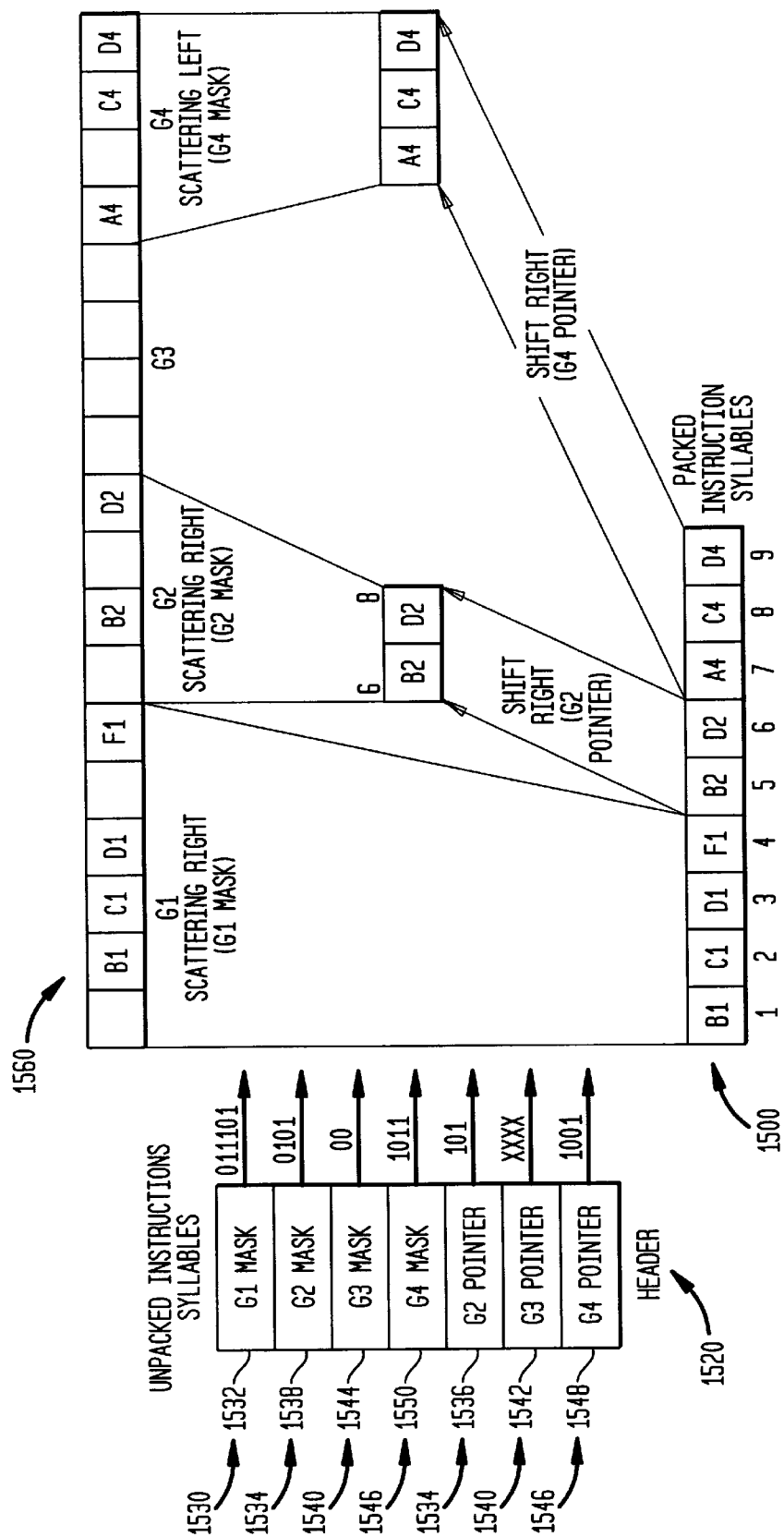
FIG. 15 is a graphical representation which illustrates an unpacking method for unpacking wide instructions in accordance with one embodiment of the present invention.

FIG. 15 illustrates a specific functionality of the operation of the unpack decode unit 800. In this exemplary embodiment, the unpack decode unit 800 includes four unpacking blocks, a first unpacking block having a capacity for six syllables and second, third and fourth unpacking blocks, each having a capacity for four syllables. Group 1 is located at the beginning of the wide instruction 1500 so that the descriptor for the first syllable group 1530 includes only a mask field 1532, but not a displacement field. The beginning syllable in the wide instruction is the first syllable following the header 1520 so that the group pointer ($G_1$ pointer) of group 1 is always 1, by definition. The mask field 1532 of group 1 has a value of '011101' so that syllables A and E of group 1 are not transferred. Syllables B, C, D and F of the six defined syllables of group 1 are transferred to the unpacked instruction syllables 1560. The second syllable group descriptor 1534 (Group 2) begins unpacking at syllable five of the wide instruction 1500 as directed by the displacement field 1536 setting of '101'. The mask field 1538 of group 2 descriptor has a value of '0101' so that syllables A and C of group 2 are not transferred. Syllables B and D of the four defined syllables of group 2 are transferred to unpacked instruction syllables 1560. The third syllable group (Group 3) of the wide instruction 1500 includes no syllables according to the mask field 1544 of setting of zero of the third syllable group descriptor 1540. The fourth and final syllable group descriptor 1546 (Group 4) begins unpacking at the ending and ninth syllable of the wide instruction 1500 as directed by the displacement field 1548 setting of '1001'. The mask field 1550 of the group 4 descriptor has a value of '1011' so that syllable C is not transferred. Syllables A, B and D of the four defined syllables of group 4 are transferred to unpacked instruction syllables 1560.

While the invention has been described with reference to various embodiments, it will be understood that these embodiments are illustrative and that the scope of the invention is not limited to them. Many variations, modifications, additions and improvements of the embodiments described are possible.

CROSS-REFERENCE

The present invention is related to subject matter disclosed in the following co-pending patent applications:

1. U.S. patent application entitled "Executing Computer Instructions by circuits having different latencies", Ser. No. 08/719,115 issued as U.S. Pat. No. 5,844,830, naming Gorshtein et. al. as inventors, and the corresponding PCT international application designating the United States of America (Ser. No. PCT/RU96/00210);

2. U.S. patent application entitled "Disambiguation Memory Circuit and Operating Method", Ser. No. 08/733,833, filed on Sep. 18, 1996, naming Babaian et al. as inventors and the corresponding PCT international application designating the United States of America (Ser. No. PCT/RU96/00215);

3. U.S. patent application entitled, "Architectural Support for execution control of prologue and eplogue periods loops in a VLIW processor", Ser. No. 08/733480 issued as U.S. Pat. No. 5,794,029, naming Babaian et al. as inventors, and the corresponding PCT international application designating the United States of America Ser. No. PCT/RU96/00213);

4. U.S. patent application entitled "Multifunctional Execution Unit, Executing Combined Operations and Supporting Continuing Instruction Flow," Ser. No. 08/733834, filed on Sep. 18, 1996, naming Gorshtein et al. as inventors, and the corresponding PCT international application designating the United States of America (Ser. No. PCT/RU96/00214);

5. U.S. patent application entitled "Array Prefetch apparatus and method," Ser. No. 08/733831 issued U.S. Pat. No. 5,889,985, naming Babaian et al. inventors, and the corresponding PCT international application designating the United States of America (Ser. No. PCT/RU96/00217); and 6. U.S. patent application entitled, "Architectural Support for Software Pipelining of Nested Loops," Ser. No. 05/733479,filed on Sep. 18, 1996, naming Babaian et al. as inventors, and the corresponding PCT international application designating the United States of America (Ser. No. PCT/RU96/00216); each of which is incorporated herein by reference, in its entirety.

What is claimed is:

1. A method for forming a wide instruction word in a packed format and unpacking the wide instruction word for execution by a plurality of execution units of a processor, said method comprising the steps of:

allocating the execution units into a plurality of groups;

compiling an instruction code into a plurality of packed wide instruction words, each including a header and an ordered sequence of syllables divided into groups, said ordered sequence of syllables corresponding to an order of the execution units in which the groups of the execution units are contiguous, a syllable corresponding to an operation for execution on a predetermined execution unit within a group of the plurality of execution units groups, the ordered sequence of syllables including syllables corresponding to operations of selected execution units within each group of plurality of execution units groups and omitting syllables corresponding to operations of nonselected execution units within each group of plurality of execution units groups, the header including a plurality of pointers and a plurality of masks, the pointer identifying a starting syllable which designates a location within a designated group of the plurality of execution unit groups and the mask designating syllables for the selected execution units within said designated group and designating NOPs for said omitted execution units within the designated group;

unpacking the packed wide instruction including the steps of:

shifting the syllables to a designated group of the plurality of execution unit groups as directed by the pointers and allocating the syllables to execution units within said designed group as directed by the masks.

2. A method according to claim 1 wherein the header includes one pointer and one mask for each group of the plurality of execution units groups, the mask and the group mutually corresponding so that the mask designates syllables for the selected execution units for the corresponding group and designates NOPs for the omitted execution units for the corresponding group.

3. A method according to claim 1 wherein:

the execution units are allocated into a plurality of groups equal to the number of execution units; and the header includes a plurality of one-bit masks each of which corresponds to an execution unit of the plurality of execution units.

4. A method according to claim 1 wherein N execution units groups are allocated in the allocating step and the header includes N-1 pointers including one pointer for each execution units group, not including a first group.

5. A method according to claim 4 wherein a pointer for a final group of the N execution units groups designates a location of the final execution units group and designates the length of the wide instruction word.

6. A method according to claim 1 further comprising the steps of:

storing the packed wide instruction word in a memory after the compiling step; and fetching the packed wide instruction word from the memory for execution.

7. A method according to claim 1 wherein:

the pointers designate a location of a designated group of the execution units groups as a displacement from a beginning location of the packed wide instruction word.

8. A method according to claim 1 wherein:

the pointers designate a location of a designated group of the execution units groups as a number of omitted syllables before the beginning of a syllable group.

9. A method according to claim 1 wherein:

a group of the plurality of execution units groups includes a plurality of execution units in a predetermined order have a predetermined starting execution unit; and a mask of the plurality of masks designates a number of selected execution units within a group of the plurality of execution units groups starting with the predetermined starting execution unit, the execution units having an order number higher than the mask number being omitted.

10. A system for forming a wide instruction word in a packed format and unpacking the wide instruction word for execution by a plurality of execution units, said system comprising:

a processor including:

a memory having storage for a plurality of wide instruction words;

an instruction word unpacking unit coupled to the memory to receive packed wide instruction words;

a plurality of execution units coupled to the instruction word unpacking unit, the execution units being allocated into groups; and a compiler for generating a program code operational on the processor, the program code including a plurality of wide instruction words in a packed format, the packed format including a header and an ordered sequence of syllables divided into groups, said ordered sequence of syllables corresponding to an order of the execution units in which the groups of the execution units are contiguous, a syllable corresponding to an operation for execution on a predetermined execution unit within a group of the plurality of execution units groups, the ordered sequence of syllables including syllables corresponding to operations of selected execution units within each group of the plurality of execution units groups and omitting syllables corresponding to operations of nonselected execution units within each group of the plurality of execution units groups, the header including one or more pointers and a plurality of masks, the pointer identifying a starting syllable which designates a location within a designated group of the plurality of execution unit groups and the mask designating syllables for the selected execution units within said designated group and designating NOPs for the omitted execution units within said designated group;

the instruction word unpacking unit including:
a scattering unit for allocating the syllables to execution units within said designated group as directed by the masks.

11. A system according to claim 10 wherein the instruction word unpacking unit further includes:
a shifter for shifting the syllables to a group of the plurality of execution unit groups as directed by the pointers.

12. A system according to claim 11 wherein the instruction word unpacking unit further includes:
an instruction register coupled to the shifter and coupled to the scattering unit, the instruction register including a header register field for holding the pointers and the masks;
a scattering control circuit coupled to the header register field for receiving the masks and coupled to the scattering unit for controlling the allocating of syllables according to the masks; and
an unpack instruction register coupled to the scattering control circuit for receiving the allocated syllables.

13. A system according to claim 10 wherein the execution units are allocated into N groups and the header includes N-1 pointers including one pointer for each execution units group, not including a first group.

14. A system according to claim 13 wherein a pointer for a final group of the N execution units groups designates a location of the final execution units group and designates the length of the wide instruction word.

15. A system according to claim 10 wherein:
the pointers designate a location of a designated group of the execution units groups as a displacement from a beginning location of the packed wide instruction word.

16. A system according to claim 10 wherein:
the pointers designate a location of a designated group of the execution units groups as a number of omitted syllables before the beginning of a syllable group.

17. A system according to claim 10 wherein:
a group of the plurality of execution units groups includes a plurality of execution units in a predetermined order have a predetermined starting execution unit; and
a mask of the plurality of masks designates a number of selected execution units within a group of the plurality of execution units groups starting with the predetermined starting execution unit, the execution units having an order number higher than the mask number being omitted.

18. A method of providing a system for forming a wide instruction word in a packed format and unpacking the wide instruction word for execution by a plurality of execution units, said system comprising the steps of:
providing a processor including:
a memory having storage for a plurality of wide instruction words;
an instruction word unpacking unit coupled to the memory to receive packed wide instruction words;
a plurality of execution units coupled to the instruction word unpacking unit, the execution units being allocated into groups; and
providing a compiler for generating a program code operational on the processor, the program code including a plurality of wide instruction words in a packed format, the packed format including a header and an ordered sequence of syllables divided into groups, said ordered sequence of syllables corresponding to an order of the execution units in which the groups of the execution units are contiguous, a syllable corresponding to an operation for execution on a predetermined execution unit within a group of the plurality of execution units groups, the ordered sequence of syllables including syllables corresponding to operations of selected execution units within each group of the plurality of execution units groups and omitting syllables corresponding to operations of nonselected execution units within each group of the plurality of execution units groups, the header including one or more pointers and a plurality of masks, the pointer identifying a starting syllable which designates a location within a designated group of the plurality of execution unit groups and the mask designating syllables for the selected execution units within said designated group and designating NOPs for the omitted execution units within said designated group;

the instruction word unpacking unit including:
a scattering unit for allocating the syllables within a group to execution units within said designated group as directed by the masks.

19. A method according to claim 18 further comprising the step of:
providing an instruction word unpacking unit which further includes:
a shifter for shifting the syllables to a group of the plurality of execution units groups as directed by the pointers.

20. A method according to claim 19 further comprising the step of:
providing an instruction word unpacking unit which further includes:
an instruction register coupled to the shifter and coupled to the scattering unit, the instruction register including a header register field for holding the pointers and the masks,
a scattering control circuit coupled to the header register field for receiving the masks and coupled to the scattering unit for controlling the allocating of syllables according to the masks; and
an unpack instruction register coupled to the scattering control circuit for receiving the allocated syllables.

* * * * *